(12) United States Patent
Usami

(10) Patent No.: US 7,990,829 B2
(45) Date of Patent: Aug. 2, 2011

(54) OPTICAL RECORDING METHOD, OPTICAL RECORDING APPARATUS, OPTICAL RECORDING MEDIUM, AND OPTICAL REPRODUCING METHOD

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1143 days.

(21) Appl. No.: 11/508,314

(22) Filed: Aug. 23, 2006

(65) Prior Publication Data

US 2007/0047421 A1    Mar. 1, 2007

(30) Foreign Application Priority Data

Aug. 24, 2005  (JP) ................................. 2005-243475

(51) Int. Cl.
    *G11B 7/00* (2006.01)
(52) U.S. Cl. ...................... 369/103; 369/116; 369/44.32
(58) Field of Classification Search .............. 369/44.32, 369/44.13, 44.29, 116, 103, 99; 359/15, 359/19, 35; 356/491
    See application file for complete search history.

(56) References Cited

U.S. PATENT DOCUMENTS

| | | | | |
|---|---|---|---|---|
| 4,133,600 A | * | 1/1979 | Russell et al. | 369/103 |
| 4,420,829 A | * | 12/1983 | Carlson | 369/103 |
| 5,745,265 A | * | 4/1998 | Hasegawa et al. | 359/15 |
| 5,815,293 A | * | 9/1998 | Komma et al. | 359/19 |
| 5,930,011 A | * | 7/1999 | Gambogi et al. | 359/15 |
| 6,061,322 A | * | 5/2000 | Jain et al. | 369/99 |
| 6,091,496 A | * | 7/2000 | Hill | 356/491 |
| 6,545,971 B1 | * | 4/2003 | Tsukamoto et al. | 369/116 |
| 6,825,960 B2 | * | 11/2004 | Curtis et al. | 359/35 |
| 2001/0008506 A1 | * | 7/2001 | Takeya et al. | 369/44.29 |
| 2002/0191501 A1 | * | 12/2002 | Ueno | 369/44.13 |
| 2003/0117932 A1 | * | 6/2003 | Morishima et al. | 369/116 |
| 2005/0135217 A1 | | 6/2005 | Tateishi et al. | |
| 2005/0162998 A1 | * | 7/2005 | Iwasaki et al. | 369/44.32 |
| 2005/0237896 A1 | | 10/2005 | Tachibana et al. | |
| 2006/0109774 A1 | | 5/2006 | Horimai et al. | |
| 2008/0002553 A1 | | 1/2008 | Tachibana et al. | |
| 2008/0037382 A1 | | 2/2008 | Ueno | |
| 2008/0123506 A1 | * | 5/2008 | Morimoto | 369/103 |

FOREIGN PATENT DOCUMENTS

| | | |
|---|---|---|
| JP | 2003-036537 A | 2/2003 |
| JP | 2003-151143 | 5/2003 |
| JP | 2003-178456 | 6/2003 |
| JP | 2003-228875 | 8/2003 |
| JP | 2004-265472 A | 9/2004 |
| JP | 2004-271884 A | 9/2004 |
| JP | 20050135217 A1 | 6/2005 |
| JP | 2005-182910 A | 7/2005 |
| WO | 2004-021339 A1 | 3/2004 |

OTHER PUBLICATIONS

Japanese Office Action for JP 2006-194389 dated, Mar. 23, 2010.
Office Action dated Nov. 30, 2010 on Japanese Application No. JP 2006-194389 English-language translation.

* cited by examiner

*Primary Examiner* — Thuy N Pardo
(74) *Attorney, Agent, or Firm* — Sughrue Mion, PLLC

(57) ABSTRACT

There are provided: an optical recording method containing a focus point controlling step, and an interference image recording step; an optical recording apparatus containing a focus point controlling unit, and an interference image recording unit; an optical recording medium recorded in accordance with the optical recording method; and an optical reproducing method reproducing a recorded information recorded in accordance with the optical recording method.

16 Claims, 9 Drawing Sheets

Address 0001

Address 0000

OPTICAL RECORDING METHOD, OPTICAL RECORDING APPARATUS, OPTICAL RECORDING MEDIUM, AND OPTICAL REPRODUCING METHOD

BACKGROUND OF THE INVENTION

1. Field of the Invention

The present invention relates to an optical recording method for recording information by holography, an optical recording apparatus using the method, an optical recording medium, an optical reproducing method, using the optical recording method. More specifically, the present invention relates to an optical recording method capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus, and the present invention relates to an optical recording apparatus, an optical recording medium, and an optical reproducing method using the method.

2. Description of the Related Art

An optical recording method for recording information on an optical recording medium by holography generally involves interference of information light (object light) having image information with reference light in an optical recording medium to record a resultant interference fringe on the optical recording medium. An example of such an optical recording method is a collinear strategy in which information light and reference light are collinearly applied. In this collinear strategy an interference fringe is formed as a result of interference between the information light and the reference light, recording image information or the like in its recording layers. The recorded information is reproduced by applying reference light identical to that for recording from the same direction to thereby produce diffracted light from the interference fringe and by receiving the diffracted light.

Upon recording or reproducing of image information or the like, controls of light focus points (e.g., focusing and tracking controls) are carried out for recording/reproducing information on/from a proper position of an optical recording medium, by adjusting variations in distance within a layer (e.g., recording layer) in the optical recording medium and/or variations in recording accuracy of the optical recording apparatus.

As a method for adjusting focus points, for example, a sampled servo method is available. In the sampled servo method, servo light is applied on an optical recording medium for focusing and tracking control, and reflected light is utilized to detect location information such as focusing information and/or tracking information for proper light irradiation. This method for adjusting focus points allows application of the information light and the reference light on the exact location on the optical recording medium, thereby recording or reproducing information (see Japanese Patent Application Laid-Open (JP-A) Nos. 2003-151143, 2003-178456 and 2003-228875).

However, on the aforementioned method for adjusting focus points, the detection is targeted only to the location information (e.g., the focusing information and the tracking information) of the servo light irradiation, and the applying location of the information light and the reference light in the thickness direction of the recording layer is not regarded as a target of the detection. Therefore, in the case where there is unevenness in the thickness of layers such as the recording layer or the position of the laminated layers relative to the thickness direction, or in the case where an error in the radiation of the optical recording and reproducing apparatus is occurred together with the error of the recording layer due to the unevenness of the thickness or layer positioning, the recording cannot be performed on the exact position even though the radiation position on the optical recording medium is controlled in advance. Especially when the recording layer is laminated with plural layers, as shown in FIG. 1, a production error is occurred between the designed distance Lw set in the optical recording and reproducing apparatus and the distance Mw of the actual optical recording medium, where the distance Lw is a designed distance from a surface of the first substrate 5 to the selective reflection layer (filter layer 6) which reflects the information light and the reference light in the optical recording medium, and the distance Mw is a distance from a surface of the first substrate 5 to the selective reflection layer (filter layer 6) in the actual optical recording medium. Similarly, an error is occurred between the designed distance Lg set in the optical recording and reproducing apparatus and the distance Mg in the actual optical recording medium, where the distance Lg is a designed distance from a surface of the first substrate 5 to the reflective layer 2 which reflects the servo light in the optical recording medium, and the distance Mg is a distance from a surface of the first substrate 5 to the reflective layer 2 in the actual optical recording medium.

Therefore, in the same optical recording and reproducing apparatus, even if the recording and reproducing can be properly performed on one optical recording medium, the reproducing may not be properly performed on another optical recording medium, and thus there is a problem in compatibility, such that the adjustment of the optical recording and reproducing apparatus is required. Since there is a limitation in reducing an error, such as unevenness of the layer thickness, during the manufacturing process, the manufacturing cost may be increased as a result of seeking such the highly accurate optical recording medium.

When recording is performed on such a good quality optical recording medium having no or only a little error, the detection of the focusing information, and the focusing control are generally performed only at the beginning, and once good quality of the optical recording medium is confirmed, the detection of the focusing information, and the focusing control are stopped. Thereafter, the address information, which is detectable even when a relatively large error exits, is detected, and then recording is performed based on the detected information. Therefore, the recording is properly performed with an accelerated recording speed.

When recording is performed on an optical recording medium having a large error, it is necessary to perform the detection of the focus information and focusing control per recording layer or recording region, or every recording, not only at the beginning, and thus the recording speed and recording efficiency are lowered.

Therefore, there are not yet realized an excellent optical recording method, optical recording apparatus, optical recording medium, and optical reproducing method, which are capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus. Accordingly, it is strongly desired to provide such that optical recording method, optical recording apparatus, optical recording medium, and optical reproducing method.

SUMMARY OF THE INVENTION

The present invention is aimed at solving the aforementioned problems in the related art, and achieving the following objects.

Namely, an object of the present invention is to provide an excellent optical recording method, optical recording apparatus, optical recording medium, and optical reproducing method, which are capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus.

The optical recording method of the present invention contains: (i) applying recording light to at least one focus point pattern recorded on a recording layer disposed in an optical recording medium, and controlling a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and a focus point recorded in the focus point pattern; and (ii) applying the recording light whose focal length L is controlled to an area other than the area where the focus point pattern is recorded on the recording layer so as to form an interference image, and recording the interference image on the recording layer. In the optical recording method of the present invention, the optical recording medium contains the recording layer for a holographic recording, and at least one focus point pattern.

The optical recording apparatus of the present invention contains: a focus point controlling unit which is configured to apply recording light to at least one focus point pattern recorded on a recording layer disposed in an optical recording medium, and to control a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and a focus point recorded in the focus point pattern; and an interference image recording unit which is configured to apply the recording light whose focal length L is controlled to an area other than the area where the focus point pattern is recorded on the recording layer so as to form an interference image, and recording the interference image on the recording layer. In the optical recording apparatus of the present invention, the optical recording medium contains the recording layer for a holographic recording, and at least one focus point pattern.

The optical recording medium of the present invention contains a recording layer for a holographic recording, and at least one focus point pattern recorded on the recording layer, wherein the optical recording medium is recorded by the optical recording method of the present invention.

The optical reproducing method of the present invention contains: applying reference light to a focus point pattern recorded on a recording layer disposed in an optical recording medium, and controlling a focal length L so as to match the focal length L with a focal length BL, where the focal length L is an a distance between a position of an objective lens disposed on an optical path of the reference light and a focus point of the reference light transmitted through the objective lens, and the focal length BL is a distance between a position of the objective lens and a focus point recorded in the focus point pattern; and applying the reference light whose focal length L is controlled to an interference image recorded in accordance with the optical recording medium of the present invention so as to reproduce a recorded information corresponding to the interference image.

BREIF DESCRIPTION OF THE DRAWINGS

Figure 1:
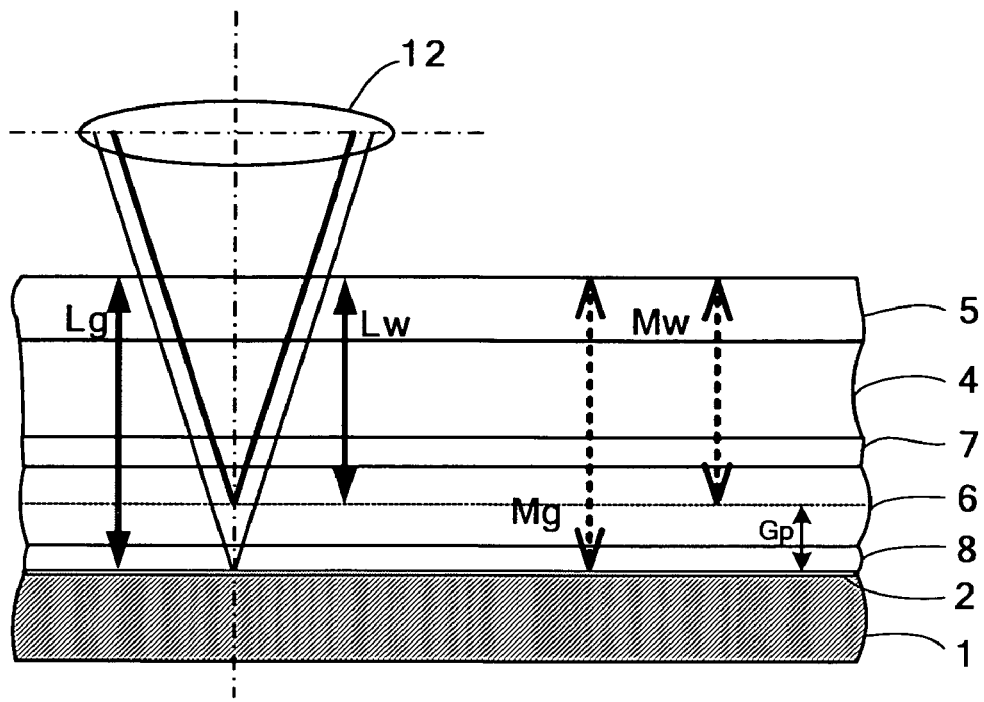
FIG. 1 is a schematic cross-sectional diagram showing an optical recording medium subjected to recording in accordance with a conventional optical recording method.

DESCRIPTION OF THE PREFERRED EMBODIMENTS (Optical Recording Method and Optical Recording Apparatus)

The optical recording method of the present invention contains a focus point controlling step, and an interference image recording step, and optionally contains appropriately selected other steps, if necessary.

The optical recording apparatus of the present invention contains a focus point controlling unit, and an interference image recording unit, and optionally contains appropriately selected other units, if necessary.

The optical recording method of the present invention can be performed by means of the optical recording apparatus of the present invention, and thus the details thereof will be explained through the explanations of the optical recording apparatus.

The focus point controlling step of the optical recording method of the present invention is suitably performed by means of the focus point controlling unit of the optical recording apparatus of the present invention. The interference image recording step of the optical recording method of the present invention is suitably performed by means of the interference image recording unit of the optical recording apparatus of the present invention. The aforementioned other steps which are optionally contained in the optical recording method of the present invention are suitably performed by means of other units equipped with the optical recording apparatus of the present invention.

<Focus Point Controlling Unit>

As mentioned above, the focus point controlling step of the optical recording method of the present invention is suitably performed by means of the focus point controlling unit of the optical recording apparatus of the present invention. The focus point controlling step is a step of applying recording light (may also referred as to information light and/or reference light, hereinafter) to at least one focus point pattern recorded on a recording layer disposed in an optical recording medium, and controlling a focal length L so as to match the focal length L with a focal length BL, where the focal length L is a distance between a position of an objective lens disposed on an optical path of the recording light and a focal point of the recording light transmitted through the objective lens, and the focal length BL is a distance between a position of the objective lens and a focal point recorded in the focal point pattern.

The focus point controlling unit is configured to apply recording light to at least one focus point pattern recorded on a recording layer disposed in an optical recording medium, and to control a focal length L so as to match the focal length L with a focal length BL, where the focal length L is a distance between a position of an objective lens disposed on an optical path of the recording light and a focal point of the recording light transmitted through the objective lens, and the focal length BL is a distance between a position of the objective lens and a focal point recorded in the focal point pattern. The aforementioned optical recording medium contains the recording layer for a holographic recording, and at least one focal point pattern recording location information relative to a thickness direction of the optical recording medium, and containing image data and/or numerical data.

The definition of the focal length L, "a distance between a position of an objective lens disposed on an optical path of the recording light and a focal point of the recording light transmitted through the objective lens," is an amount set by a computer controlling unit or optical system of the optical recording apparatus, i.e. initial amount, and means a distance between the objective lens and a focal point of a light at the time the light whose optical distance is controlled by the optical system is transmitted through the objective lens disposed facing to the optical recording medium, and irradiated to the optical recording medium.

Moreover, the optical recording medium suitably contains two or more focus point patterns, and the focus point controlling step and the interference image recording step are performed with respect to each of the focus point patterns.

Specifically, to an optical recording medium containing n (n is an integer of 1 or more) focus point patterns, the recording light is applied to the first focus point pattern, and controlling the focal length L so as to match the focal length L with the focal length BL, and the recording light whose focal length L is controlled is applied to an area of the recording layer other than the area where the focal point patterns are formed so as to form an interference image, and the interference image is recorded on the recording layer.

Sequentially, the recording light is applied to the second focus point pattern, and controlling the focal length L so as to match the focal length L with the focal length BL of the second focus point pattern, and the recording light whose focal length L is controlled is applied to an area of the recording layer other than the area where the focal point patterns are formed so as to form an interference image, and the interference image is recorded on the recording layer. By repeating this operation n times, highly accurate recording is possible at the focal length L corresponding to each area of the optical recording layer even when the focal point in the recording layer is not constant due to the deformation or the like of the optical recording medium.

For simplicity, the present invention is explained in the case where the number of the focus point pattern is one, i.e., n=1, hereinafter. The detection of deviation related to other focus point patterns are performed in the same manner as when the number of the focus point pattern is one.

-Focus Point Information-

The focus point information is not particularly limited provided that it is information related to a position on an optical axis of the recording light (the information light and/or the reference light) relative to a thickness direction of the recording layer disposed in the optical recording medium, and can be appropriately selected depending on the intended purpose. For example, the focus point information is a location (a, b, c), which is "a" from X-axis, "b" from Y-axis, and "c" from Z-axis. Here, address information recorded in the pre-pit region or in the recording layer of the optical recording medium is utilized, and an arbitrarily selected address from the address information is determined as a starting point. The X-axis and Y-axis are taken on a surface horizontal to the recording layer, and the Z-axis is takes along the thickness direction of the recording layer. Note that, "a" is $a \geq 0$, "b" is $b \geq 0$, and "c" is $c > 0$. In the case where a=0, and b=0, the location is different from the address location only in terms of the thickness direction of the recording layer, and thus it is preferable for detecting the focus point of the information light and/or the reference light. Another examples of the focus point information include location information used for tracking servo, location information using location information formed on wobble or the like as a starting point, and location information recorded as a recorded pattern which merely reflects the light in varied intensities.

Since the focus point information is a reference information for controlling the locations of the information light and/or the reference light for recording, the extremely highly accuracy is required. For example, the location error of each a, b and c is preferably within 100 μm, more preferably within 10 μm, furthermore preferably within 3 μm, and the most preferably within 1 μm. The reason for the preferable range of within 100 μm is such that the control of the applying locations of the information light and/or the reference light is possible, if the error (dislocation) is within 100 μm. If the error is approximately 100 μm, excessively high accuracy is not required for the optical recording apparatus, and thus the production efficiency is not adversely lowered. Moreover, even if the location is dislocated, there is no problem in control, as long as the dislocated amount is known, and the control is performed based upon the dislocated amount. It is preferable that such the dislocated amount is recorded on the optical recording medium.

-Focus Point Pattern-

The focus point pattern is not particularly limited, and can be appropriately selected depending on the intended purpose. Examples thereof include a pattern which reflects reference light as information light.

In the case where the focus point of the reference light is dislocated from the focus point pattern at the time of reproducing the focus point pattern, it is preferable that the focus point pattern is recorded in a manner such that the quantity of the reflected light therefrom is reduced depending on the dislocated amount. Therefore, the dislocated amount can be detected based upon the quantity of the reflected light from the focus point pattern.

-Region for Recording the Focus Point Pattern-

The region for recording the focus point pattern is not particularly limited provided that at least one focus point pattern is recorded at least in or on the recording layer, and can be appropriately selected depending on the intended purpose. For example, within the recording layer, the region may be any arbitrarily selected position on a face horizontal to the surface of the recording layer, or any three-dimensional region including an area along a thickness direction of the recording layer. Examples of the region other than the recording layer include a pre-pit layer, a gap layer, a cover layer, and the like.

-Number of the Focus Point Pattern-

The number of the focus point pattern is not particularly limited provided that there is one focus point pattern recorded in the optical recording medium, and can be appropriately selected depending on the intended purpose. The number is, for example, 1-1,000, preferably 3-100, and more preferably 5-30. The aforementioned number can be set with respect to a track for tracking servo. In this case, the number is, for example, 1-100 per track, 1 per 10 tracks, or 1 per 100 tracks, and preferably 1 per 1,000 tracks. Track(s) may be disposed on other area than the area where the track(s) for servo tracking is formed. In this case, the number of the focus point pattern is 1-100 per track, 1 per 10 tracks, or 1 per 100 tracks, and preferably approximately 1 per 1,000 tracks. In the case where the number of the recorded focus point pattern is over 1,000, the production efficiency tends to be lowered at the time of forming the focus point pattern. It is generally sufficient for detect the focus point pattern, if the deposited number thereof is 1,000.

-Recording Method of the Focus Point Pattern-

The recording method of the focus point pattern is not particularly limited, and can be appropriately selected depending on the intended purpose. For example, the focus point pattern can be recorded as an interference image of numerical data or data image related to a position along the thickness direction, by using the information light and/or the reference light, and can be fixed thereafter. The recording is preferably performed by means of a highly accurately controlled optical recording apparatus during a manufacturing process of an optical recording medium in a factory, rather than being performed by means of individual optical recording apparatuses after manufacturing the optical recording medium. Since the focus point pattern is a reference pattern for detecting a focus point of information light and/or a reference light relative to a thickness direction of a recording layer at the time of recording by using the information light and/or the reference light in any optical recording and reproducing apparatus, it is sufficient enough if the focus point pattern is recorded on the optical recording medium during the manufacturing process thereof, and it is complicated and inefficient to record a focus point pattern every time the optical recording medium is set in an optical recording and reproducing apparatus. As mentioned above, the focus point pattern is accurately and uniformly recorded in a predetermined region within the recording layer.

-Method for Detecting a Focus Point-

Figure 2:
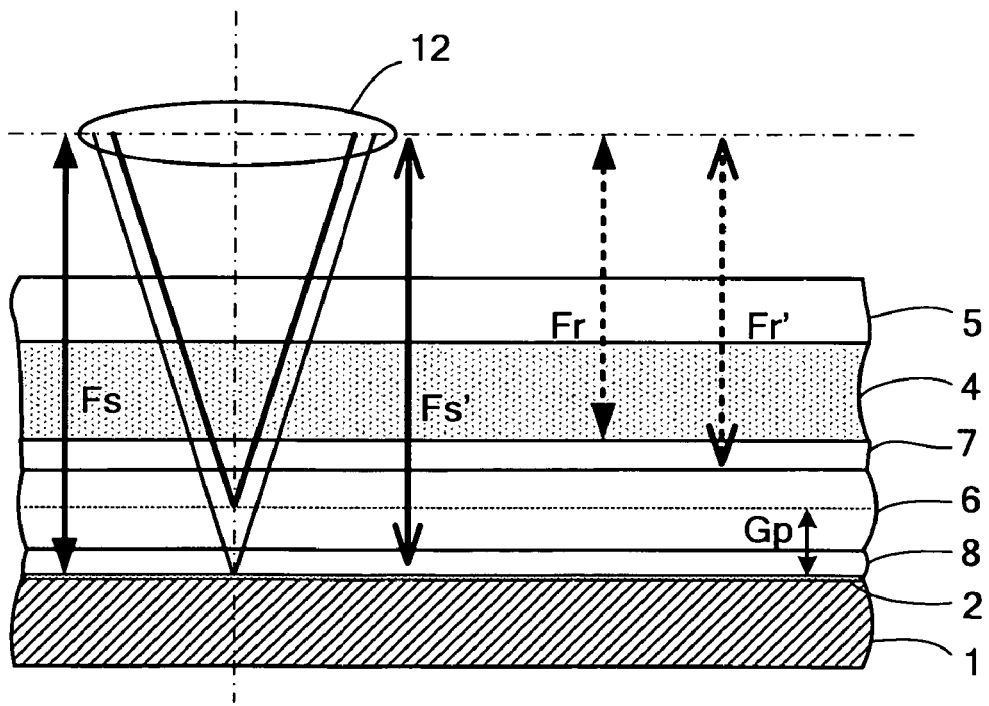
FIG. 2 is a schematic cross-sectional diagram showing an example of an optical recording medium subjected to recording in accordance with the optical recording method of the present invention.

The method for detecting the focus point is not particularly limited, and can be appropriately selected depending on the intended purpose. For example, there is a method such that, as shown in FIG. 2, the information light and/or the reference light (recording light) are applied to the focus point pattern under the condition that the tracking servo is performed by applying the servo light, and the focusing servo is performed based on the focal length Fs set in the optical recording medium so as to match the focal length Fs' of the actual servo light and the focal length Fs to thereby control the focus point and optical axis of the servo light to the exact places, the reflected light (diffracted light) from the focus point pattern is received, and the degree of the dislocation of the focus point of the information light and the reference light from the focus point pattern is detected. Another example is a method wherein the tracking location is offset at a predetermined amount at the time of the tracking control, and its deviation is detected from the diffracted light of the focus point pattern.

In the former method, if the focus point Fr' of the actual information light and/or the reference light (recording light) is matched with the predetermined focal point Fr as a result of the detection, as shown in FIG. 2, and the condition that the focus point Fr' of the information light and/or the reference light is positioned at the exact place is confirmed, it is detected that the focus point of the information light and/or the reference light and the focus point pattern are matched to the predetermined values, and thus there is no error.

If it is found that there is a gap between Fr and Fr' and Fr' is not position at the exact place as a result of the detection, the focusing control for the focus point of the information light and/or the reference light is performed, and the information light and/or the reference light is sifted so as to match Fr and Fr', i.e. Fr=Fr', to thereby control a focal length L.

In the case where the optical recording medium contains a plurality of the focus point patterns, the focus point controlling step is performed with respect to each of the focus point patterns so as to control the focal length L of the recording light, and the controlled amount therein is detected as a deviation $\Delta Ln$ (n is an integer of 1 or more). The minimum deviation $\Delta Lmin$ is determined as a minimum squared value among the detected deviations $\Delta Ln$. The reason why the minimum value is obtained by squaring the detected deviation $\Delta Ln$ is that the value of the deviation $\Delta Ln$ can be plus or minus depending on the cases where the focus position of the recording light is sifted towards the objective lens or the opposite direction along the direction of the irradiation (Z-axis direction) at the time of controlling the focal length, and thus it is necessary to determine $\Delta Ln$ having the minimum absolute value of $\Delta Ln$ as $\Delta Lmin$.

The method for shifting the information light and/or the reference light to match the focus point thereof is, for example, such that the information light and/or the reference light are applied to the focus point pattern, the diffracted light therefrom is received, the applied information light and/or reference light are sifted by means of a transfer unit in the thickness direction of the recording layer so as to detect the location where the signal intensity of the reflected light becomes maximum to thereby control the focal length L, and then the focus of the information light and/or the reference light can be matched with the focus point of the focus point pattern.

The method for detecting the maximum value of the signal intensity is not particularly limited, and can be appropriately selected depending on the intended purpose. Examples thereof include a peak hold method, and the like.

Another example of the method for sifting the information light and/or the reference light is such that the information light and/or the reference light are applied to the focus point pattern, the diffracted light therefrom is received, the information and reference light is sifted by means of a transfer unit in the thickness direction of the recording layer so as to detect the location where the signal error of the reflected light becomes minimum, and then the focus point of the information light and the reference light can be matched with the focus point of the focus point pattern.

The method for detecting the minimum value of the signal error is not particularly limited, and can be appropriately selected depending on the intended purpose. Examples thereof include a peak hold method, and the like.

The transfer unit is not particularly limited, and can be appropriately selected depending on the intended purpose. Examples thereof include a servo mechanism, and the like.

The servo mechanism is not particularly limited, and can appropriately be selected depending on the intended purpose. Examples thereof include a mechanism such that a focus error signal is generated corresponding to the deviation, the signal is transmitted and provide an instruction to a driving device via a phase compensated drive amplifier which amplifies the signal, the driving device sifts a location of an objective lens, e.g., a condenser lens, so as to control the focus point distance.

The driving device is not particularly limited, and can be appropriately selected depending on the intended purpose. Examples thereof include an actuator, a stepping motor, and the like.

-Detection of the Deviation of the Focus Point-

Figure 3:
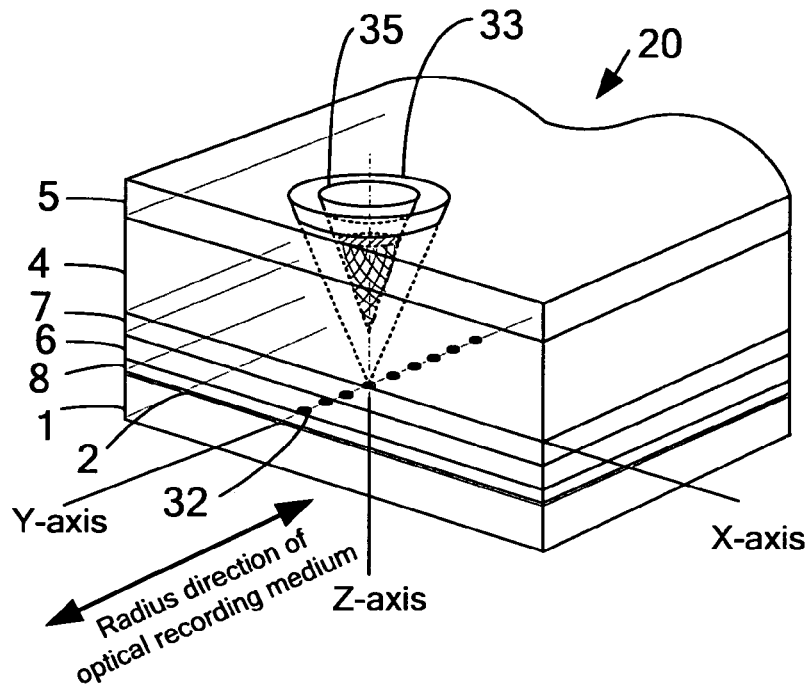
FIG. 3 is a partial perspective diagram showing optical axes of servo light and information light.
Figure 4:
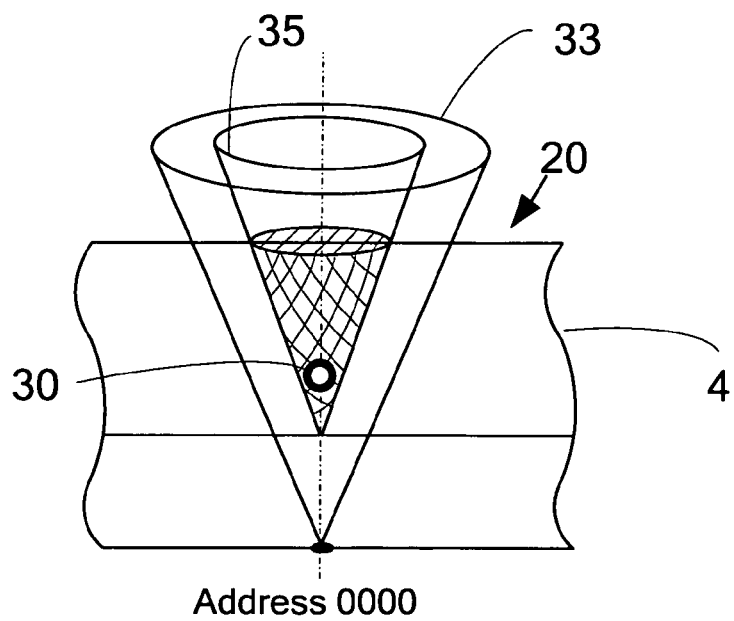
FIG. 4 is an enlarged diagram showing a partial view of FIG. 3.

The detecting method of the deviation is not particularly limited, and can be appropriately selected depending on the intended purpose. For example, as shown in FIGS. 3 and 4, an address information and the focus point information are recorded on the optical recording medium wherein the address information (0000) is determined as a starting point, X-axis and Y-axis are taken on a surface horizontal to the recording layer, Z-axis is taken along the thickness direction of the recording layer, a location (a, b, c) which is "a" from the X-axis, "b" from the Y-axis, and "c" from the Z-axis (a $\geqq$0, b $\geqq$0, c >0) is recorded on the recording layer as the focus point information, and the address information is recorded on the optical recording medium as a location (a, b, 0) relative to the aforementioned X-, Y-, and Z-axes. In this case, the address information is detected by the servo light, the focal point pattern is then detected by applying the information light and/or the reference light based upon the detected address information, and based upon the detected results, the focal length L of the information light and/or the reference light are controlled in the thickness direction to thereby obtain the deviation $\Delta$Ln. In FIGS. 3 and 4, the servo light is represented as element 33, and the information light and/or the reference light is represented as element 35. The present invention has been explained regarding one focal point for simplicity, but the optical recording medium of the present invention actually contains n (n>1) focus point patterns, and n (n>1) deviations $\Delta$Ln is obtained.

The detection of the address information by using the servo light is carried out by applying the servo light to the optical recording medium, receiving the reflected light therefrom to detect the address of the exposed portion, and the deviation $\Delta$Ln in the Z-axis direction is detected from a dislocated degree of a focal length L of the applied information and reference light from the focal length BL based on the focal position (a, b, c).

The detection of the address information by using the servo light is carried out by detecting a location in the thickness direction of the optical recording medium so as to perform a focusing control, matching the focus point of the servo light with the address information, and then detecting the horizontal location. The focusing control is performed on a few regions at first, and then, if it is judged that the address information can be recognized without performing further focusing controls, it is not necessary to sequentially carry out the focusing control.

-Other Detecting Methods of the Focus Point of the Recording Light, and Controlling Method of the Focal Length L-

Other detection methods of the focus point of the information light and/or the reference light (recording light) are not particularly limited, and can be appropriately selected depending on the intended purpose. Examples thereof include an astigmatism method, a Foucault method, and a critical angle method (refer to "Illustrative Compact Disc Handbook (Zukai Compact Disc Tokuhon)", by Hirataro Nakajima and Hiroshi Ogawa, Ohmsha Publishing, the first edition, 1986).

When the dislocation of the focus point of the information light and/or the reference light is detected in accordance with these detecting methods, the focal length L of the information light and/or the reference light is controlled so as to place the focal point at the location where the dislocation is corrected.

-Astigmatism Method-

According to the astigmatism method, a derivation between a recording location in a recording layer formed in a subjective optical recording medium, and a focus point of the information light and/or the reference light is detected. Namely, it is detected the deviation between the focal distance, i.e. a distance between the center of the objective lens and the focus point of the information light and/or the reference light, and a distance from the center of the objective lens to the recording location in the recording layer. In the astigmatism method, a beam splitter or the like is arranged in between the light source and the objective lens on a light path wherein the light is emitted from the light source, transmitted through the objective lens and applied to the optical recording medium. The reflected light is split by means of the beam splitter, and transmitted through a cylindrical lens to focus an image. In the case where the focused image is circle, it is detected that the focal distance is matched. In the case where the focused image is a vertically-long oval, it is detected that the optical recording medium is positioned too close relative to the objective lens. In the case where the focused image is horizontally-long oval, it is detected the optical recording medium is positioned to far relative to the objective lens.

The detection is performed by splitting the reflective light into four, and comparing the shapes of the images in the diagonal regions.

-Foucault Method-

The Foucault method applies the identical process to the astigmatism method until the arrangement of the beam splitter, the collection of the reflected light, and the transmission of the reflected light through the cylindrical lens. In the Foucault method, a prism is arranged at a place where the reflected light transmitted through the cylindrical lens is focused to form an image. In the case where the image is focused at the apex angle of the prism, it is detected that the focal distance is matched. In the case where the image is focused over the apex angle, it is detected that the optical recording medium is positioned too close relative to the objective lens. In the case where the image is focused before the apex angle, it is detected that the optical recording medium is positioned too far relative to the objective lens. The focusing point of the image is detected by splitting the reflected light into two, allocating a sensor for each beam of light, and measuring the intensity of each beam.

-Critical Angle Method-

According to the critical angle method, a deviation between a recording position in a recording layer formed in the subjective optical recording medium, and the focus point of the information light and/or the reference light is detected. Namely, it is detected the deviation between the focal distance, i.e. a distance between the center of the objective lens and the focus point of the information light and/or the reference light, and a distance from the center of the objective lens to the recording position in the recording layer. In the critical angle method, a prism is arranged in between the light source and the objective lens on the light path wherein the light is emitted from the light source, passed through the objective lens and applied to the optical recording medium. Here, the prism is disposed in a manner such that an incident angle of a ray of the center of incident light flux becomes a critical angle (an angle where the incident light is totally reflected at the surface of the prism). The focus point is detected by leading the reflected light from the prism, and detecting the brightness of the reflected light. In the case where the optical recording medium is positioned too close or far relative to the objective lens, the quantity of the light reflected from the prism is reduced. By using this tendency, the focus point can be detected by judging the distance (close or far) with the polarity of positive and negative (+ and −).

The detecting method of the horizontal location is not particularly limited, and can be appropriately selected depending on the intended purpose. Examples thereof include a three-beam method, a push-pull method, and a differential phase detection (DPD) method (refer to "Illustrative Compact Disc Handbook (Zukai Compact Disc Tokuhon)", by Hiratoro Nakajima and Hiroshi Ogawa, Ohmsha Publishing, the first edition, 1986).

-Three-Beam Method-

The three-beam method is a method which detects a deviation of the applying location of the servo light from a track formed on the subjective optical recording medium. In the three-beam method, three beams including a substantially circular main beam, secondary beam A, and secondary beam B are used. The secondary beam A, the main beam, and the secondary beam B are equally spaced, and linearly arranged in this order. The main beam is disposed in a position where the center of the circle of the irradiated main beam is located in the middle of the width of the track. The secondary beam A is disposed in a position where the bottom of the circle of the irradiated secondary beam A contacts with the edge of the width of the track. The secondary beam B is disposed in a position where the top of the circle of the irradiated secondary beam B contacts with the edge of the width of the track.

When these beams are applied to the track in such the arrangement, a weak reflected light is reflected from the track surface, and the strong reflected light is reflected from other than the track surface. By detecting the intensity of each reflected lights, it can be detected a deviation between the irradiated positions of the three beams and the position of the track.

-Push-Pull Method-

The push-pull method is a method which detects a deviation between the position of the applied servo light and a track formed in the subjective optical recording medium. In the push-pull method, one beam is applied on the track, and the deviation is detected by a half-split beam detector. The half-split beam detector detects the reflected light by splitting the reflected beam into two parts. In the case where the beam is applied on the center of the track width, the intensity of each light split into the left part and the right part is detected as equal. In the case where the beam is applied to either sides of the track width, the intensity of the reflected beams are detected as weak at the track surface, but detected as strong at other than the track surface. The intensity of each beam split into the left part and the right part is therefore detected as asymmetrically distributed.

-DPD Method-

The DPD (Differential phase detection) method is a method which detects a deviation between the position of applied servo light and a track formed in the subjective optical recording medium. In the DPD method, a quarter-split beam detector is used. The quarter-split beam detector is further split the beam as of the half-split beam detector used in the push-pull method. In the case where the beam is applied on the center of the track width, the intensity of the right part and the left part of the quarterly split light split into the four regions is detected as equal. In the case where the beam is applied to either sides of the track width, the intensity of the reflected beams are detected as weak at the track, but detected as strong at other than the track. The intensity of each quarterly split beam is detected as asymmetry with the left part and the right part by detecting the intensity distributions of a pair of the diagonally positioned regions within the quarterly split regions.

-Radiation of the Recording Light to the Focus Point Pattern-

The radiation of the recording light (the information light and/or the reference light) to the focus point pattern is not particularly limited, and can be appropriately selected depending on the intended purpose. For example, it can be utilize the same light to that for recording, or a weaker light than the light for recording. In the case where the weaker light than the light for recording is used, the exposure energy is preferably 0.1 $\mu J/cm^2$ to 10,000 $\mu J/cm^2$, more preferably 1 $\mu J/cm^2$ to 1,000 $\mu J/cm^2$, and furthermore preferably 10 $\mu J/cm^2$ to 100 $\mu J/cm^2$. In the case where the exposure energy is less than 0.1 $\mu J/cm^2$, the detection of the focus point may not be sufficiently performed. In the case where the exposure energy is more than 10,000 $\mu J/cm^2$, the interference image may be unintentionally recorded on the recording layer. The radiation of the interference light or the reference light does not cause an interference of light, and thus is suitably applied for the detection of the focus point. The radiation of both the interference light and the reference light is applied for the detection of the focus point provided that the exposure energy is weakened enough not to perform unintentional recording on the optical recording medium.

<Interference Image Recording Unit>

As mentioned above, the interference image recording step of the optical recording method of the present invention is suitably performed by means of the interference image recording unit of the optical recording apparatus of the present invention. The interference image recording step is a step of applying the recording light whose focal length L is controlled to an area other than the area where the focus point pattern is recorded on the recording layer so as to form an interference image, and recording the interference image on the recording layer.

The interference image recording unit applies the recording light (the information light and/or the reference light) whose focal length L is controlled by means of the focal point controlling unit, to an area other than the area where the focus point pattern is recorded on the recording layer, forms an interference image, and record the interference image on the recording layer.

In the case where two or more focus point patterns are recorded on the optical recording medium, an interference image is preferably recorded based on the focal length L controlled by the focal point controlling unit with respect to each of the focus point pattern, and thus highly accurate recording is possible.

Moreover, it is preferable, in view of recording efficiency, that, after controlling the focal length L of the recording light with respect to each of the focal point patterns, detecting the controlled amounts as deviations $\Delta Ln$ (n is an integer of 1 or more), and obtaining the minimum deviation $\Delta Lmin$ having the minimum squared value among the detected deviations $\Delta Ln$, recordings of all the interference images are performed by means of the interference image recording unit by using the recording light whose focal length L is controlled based on $\Delta Lmin$.

The method of recording interference image is, for example a method wherein the brightness contrast of the interference fringe is recorded within the recording layer as variations of the reflective index. In this method, the recording layer contains a photosensitive material such as a photopolymer, and the photosensitive material induces a polymerization reaction in the bright part of the interference fringe as a result of radiation of light, and no polymerization reaction is occurred in the dark part of the interference fringe. Therefore, the bright part has higher refractive index, and the dark part has lower refractive index. In this manner, the variations of the refractive index are generated.

The radiation method of the information light and the reference light is not particularly limited, and can be appropriately selected depending on the intended purpose. For example, the reference light is applied with a certain angle with respect to the applied angle of the information light. Alternatively, the information light and the reference light are applied to the recording layer so as to the optical axes thereof are collinearly aligned.

Among them, the recording is preferably performed by applying the information light and the reference light so as to align the optical axes thereof collinearly, namely, in accordance with a collinear system, since it enables high multiplex recording, and high information transfer speed.

As a light source for the information light and the reference light, a light source which emits a coherent laser light is suitably used. Examples of such the light source include a solid laser oscillator, a semi-conductor laser oscillator, a liquid laser oscillator, a gas laser oscillator, and the like. Among them, the gas laser oscillator and the semi-conductor laser oscillator are preferable.

The laser light is not particularly limited and can be appropriately selected depending on the intended purpose. For example, the laser light is a light having a wavelength ranging from 360 nm to 850 nm. The wavelength of the laser light is preferably 360 nm to 800 nm, more preferably 400 nm to 750 nm, and the most preferably 500 nm to 600 nm since it is in the center of the visible light range, and hence is the most recognizable.

In the case where the wavelength is shorter than 360 nm, the clear interference image may not be obtained. In the case where the wavelength is over 850 nm, the interference fringe becomes very precise, and thus it may not be able to obtain the photosensitive material which corresponds to the very precise interference fringe.

The exposure energy of the laser light is not particularly limited, and can be appropriately selected depending on the intended purpose. For example, it is preferably 0.1 $\mu J/cm^2$ to 10,000 $\mu J/cm^2$, more preferably 1 $\mu J/cm^2$ to 1,000 $\mu J/cm^2$, and the most preferably 10 $\mu J/cm^2$ to 100 $\mu J/cm^2$. In the case where the exposure energy is less than 0.1 $\mu J/cm^2$, the recording may not be performed.

<Other Units>

As the other units, for example, an interference image fixing unit, or the like is available.

-Interference Image Fixing Unit-

The interference image fixing unit is a unit for applying fixing light to the interference image recorded on the recording layer by means of the interference image recording unit so as to fix the recorded interference image on the recording layer. By sufficiently applying the fixing light to the region where the interference image is recorded, the interference image is efficiently fixed, the storage stability is improved as a result of the fixing, and there can be attained an optical recording medium which does not cause an error such as noise at the time of reproducing.

-Fixing Light-

The applying area of the fixing light is appropriately selected depending on the intended purpose. For example, it is preferably the same area as the recorded area which is recorded by the information light and the reference light at an arbitrary selected part in the recording layer, or preferably an area which is larger than the recorded area, and is extended from the outer boundary of the recorded area at 1 μm or less in the outer direction. If the fixing light is applied to an area which is extended from the outer boundary of the recorded area at over 1 μm, the fixing light may be also applied to the adjacent recorded area to the subjective recorded area, the exposure energy of the fixing light becomes excessive, and thus it is inefficient.

The application duration of the fixing light is not particularly limited, and can be appropriately selected depending on the intended purpose. For example, it is preferably 1 ns to 100 ms, and more preferably 1 ns to 80 ms at an arbitrary selected part in the recording layer. In the case where the application duration is shorter than 1 nm, the fixing may be insufficient. In the case where the application duration is longer than 100 ms, the applied exposure energy may become excessive. The aforementioned application of the fixing light is preferably performed within 28 hours from the recording of the interference image. In the case where the fixing light is applied after 28 hours from the recording of the interference image, the signal quality of the recorded information may be lowered.

The applying direction of the fixing light is not particularly limited, and can be appropriately adjusted depending on the intended purpose. For example, the applying direction may be the same to, or different from, the applying direction of the information light and the reference light at an arbitrary selected part on the recording layer. The application angle is preferably 60° or less, and more preferably 40° or less with respect to the surface of the recording layer. In the case where the application angle is outside the aforementioned range, the fixing may be inefficient.

The wavelength of the fixing light is not particularly limited, and can be appropriately selected depending on the intended purpose. For example, the wavelength thereof is preferably 350 nm to 850 nm, and more preferably 400 nm to 600 nm. In the case where the wavelength is less than 350 nm, the material of the recording layer may be decomposed. In the case where the wavelength is more than 850 nm, the material of the recording layer may be deteriorated due to the elevation of the temperature.

The light source of the fixing light is not particularly limited, and can be appropriately selected depending on the intended purpose. For example, the light source is preferably identical to the light source of the information light and the reference light in view of that it is not necessary to newly dispose another light source only for the fixing light. The light source for the information light and the reference light is used as the light source of the fixing light by applying the emitted light from the light source to the optical recording medium. By using the same light source, the application area of the fixing light can be easily matched with the recorded area of the interference image, and thus the fixing light is efficiently applied.

The application amount of the fixing light is not particularly limited, and can be appropriately adjusted depending on the intended purpose. For example, it is preferably 0.001 mJ/cm$^2$ to 100 mJ/cm$^2$, and more preferably 0.01 mJ/cm$^2$ to 10 mJ/cm$^2$ at an arbitrary selected part in the recording layer.

The method of applying the fixing light is not particularly limited, and can be appropriately selected depending on the intended purpose. For example, it is preferably a method wherein the light emitted from the same light source to that for the information light and the reference light is applied to an arbitrary selected part in the recording layer. Alternatively, the light emitted from another light source can be applied as the fixing light.

(Optical Recording Medium)

The optical recording medium of the present invention contains a recording layer above a substrate. The recording layer is capable of recording information at least by holography, and has an interference image recorded and fixed thereon upon radiation of fixing light.

The optical recording medium of the present invention can be a relatively thin recording medium for a flat holography which records two-dimensional information, etc., or a recording medium for a volume holography which is capable of recording large volume of information such as three-dimensional images. Moreover, the optical recording medium of the present invention can be a reflective holographic recording medium, or a transmission holographic recording medium. Furthermore, examples of the holographic recording system for the optical recording medium of the present invention include a amplitude holography, a phase holography, a blazed holography, and a complex amplitude holography.

Specifically, the optical recording medium is preferably a reflective optical recording medium which is utilized for a collinear optical recording system. Such optical recording medium contains a first substrate, a recording layer, a filter layer, and a second substrate, and optionally contains other layers, if necessary.

<Recording Layer>

The recording layer contains a photosensitive material which is capable of recording information by holography. The photosensitive material is a material which changes its optical characteristics such as extinction coefficient or refractive index corresponding to a intensity of an emitted electromagnetic wave having the predetermined wavelength.

The photosensitive material for use in the recording layer is not particularly limited, and can be appropriately selected depending on the intended purpose. Examples thereof include: (1) photopolymers which are polymerized as a result of polymerization reactions induced by radiation of light; (2) photorefractive materials exhibiting a photorefractive effect (changing their refractive index as a result of a spatial charge distribution induced by radiation of light); (3) photochromic materials which change their refractive index as a result of a molecular isomerization caused by radiation of light; (4) inorganic materials such as lithium niobate, and barium titanate; (5) chalcogen materials.

The aforementioned photopolymers (1) are not particularly limited, and can be selected depending on the intended purpose. For example, the photopolymer contains a monomer, and a photoreaction initiator, and optionally contains other components such as a sensitizer, oligomer, and the like, if necessary.

As the photopolymer, those described in the following publications can be used: "Photopolymer Handbook" (Kogyo Chosakai publishing., 1989); "Photopolymer Technology" (THE NIKKAN KOGYO SHIMBUN LTD., 1989); SPIE Journals and Proceedings Vol. 3010, p. 354-p. 372 (1997); SPIE Journals and Proceedings Vol. 3291, p. 89-p. 103 (1998). In addition, those described in the following patent publications are also used as the photopolymer: U.S. Pat. Nos. 5,759,721, 4,942,112, 4,959,284, and 6,221,536; International Patent Application Publication Nos. WO/97/44714, 97/13183, and 99/26112; Japanese Patent Application Publication (JP-B) Nos. 2880342, 2873126, 2849021, 3057082, and 3161230; JP-A Nos. 2001-316416, and 2000-275859.

As the method for irradiating the photopolymer with a light so as to change its optical characteristics, a method utilizing a dispersion of low molecular substances is applicable. In this method, a substance which disperses to the direction opposite to the polymerizing direction of the polymerizable substance is added. Alternatively, a compound having an acid cleavage structure is optionally added to the photopolymer.

In the case that the recording layer is formed by using a photopolymer containing the low molecular substance, it is necessary that the recording layer has a structure which is able to hold a liquid therein. In the case where the compound having an acid cleavage structure is added, the volume change can be controlled by compensating the expansion caused by the cleavage with the shrinkage caused by the polymerization of the monomer, or vise versa.

The monomer is not particularly limited, and can be appropriately selected depending on the intended purpose. Examples thereof include a radical polymerizable monomer having an unsaturated bond such as acrylic group or methacrylic group, a cationic polymerizable monomer having an ether structure such as epoxy ring or oxetane ring, and the like. These monomers may be mono- or multi-valent. These monomer may also be photo-crosslinkable.

Examples of the radical polymerizable monomer include acryloylmorpholine, phenoxyethylacrylate, isobomylacrylate, 2-hydroxypropylacrylate, 2-ethylhexylacrylate, 1,6-hexanedioldiacrylate, tripropyleneglycoldiacrylate, neopentylglycol PO-modified diacrylate, 1,9-nonandioldiacrylate, hydroxyl-pivalic acid neopentylglycoldiacrylate, EO-modified bisphenol A diacrylate, polyethleneglycoldiacrylate, pentaerythritoltriacrylate, pentaerythritoltetraacrylate, pentaerythritolhexaacrylate, EO-modified glyceloltriacrylate, trimethylolpropanetriacrylate, EO-modified trimethylolpropanetriacrylate, 2-naphtho-1-oxyethylacrylate, 2-cabazoil-9-yl-ethylacrylate, (trimethylsilyloxy)-dimethylsilylpropylacrylate, and vinyl-1-naphthoate, N-vinylcarbazol.

Examples of the cationic polymerizable monomer include bisphenol A epoxy resins, phenol novolac epoxy resins, glyceloltriglycidylether, 1,6-hexaneglycidylether, vinyltrimethoxysilane, 4vinylphenyl-trimethoxysilane, γ-methacryloxypropyl-triethoxysilane, and compounds expressed by the following structural formulas A to E:

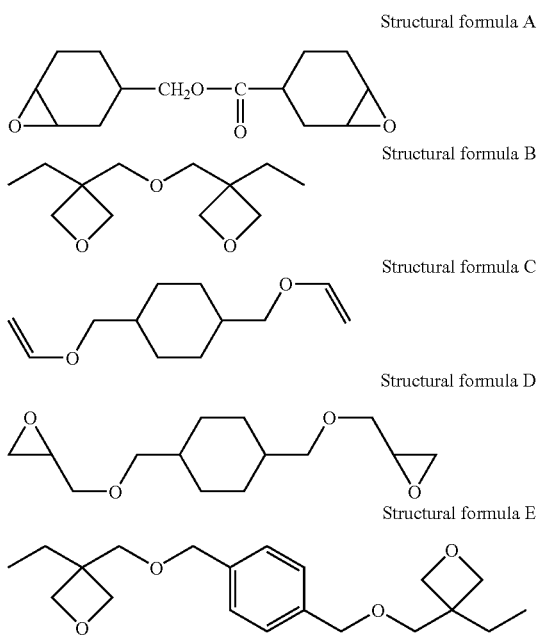

Structural formula A

Structural formula B

Structural formula C

Structural formula D

Structural formula E

These monomers can be used singly or in combination of two or more.

The photopolymerization initiator is not particularly limited, and can be appropriately limited depending on the intended purpose. The photopolymerization initiator is materials which induces radical polymerization, cationic polymerization, crosslinking reaction, or the like upon radiation of light.

Examples of the photopolymerization initiator include 2,2-bis(o-chlorophenyl)-4,4',5,5'-tetraphenyl-1,1'-biimidazole, 2,4,6-tris(trichloromethyl)-1,3,5-triazine, 2,4-bis(trichloromethyl)-6-(p-methoxyphenylvinyl)-1,3,5-triazine, diphenyliodoniumtetrafluoroborate, diphenyliodoniumhexafluorophosphate, 4,4'-di-t-butyldiphenyliodoniumtetrafluoroborate, 4-diethylaminophenylbenzeneazoniumhexafluorophosphate, benzoin, 2-hydroxy-2-methyl-1-phenylpropane-2-one, benzophenon, thioxanthone, 2,4,6-trimethylbenzoyldiphenylacylphosphineoxide, triphenylbutylboratetetraethylammonium, and a titanothene compound expressed by the following structural formula:

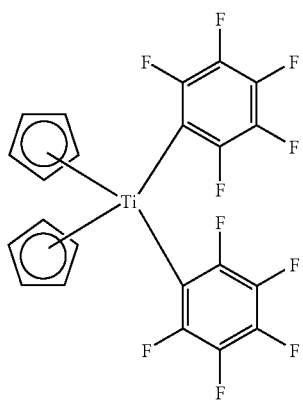

These may be used singly or in combination of two or more. Moreover, the photopolymerization initiator can be used together with a sensitizing dye corresponding to the irradiating light.

The photopolymer is obtained by mixing and stirring the monomer, the photopolymerization initiator, and other components, if necessary, and then reacting the mixture. If the thus obtained photopolymer has a sufficiently low viscosity, a recording layer can be formed by casting the photopolymer. If the photopolymer has too high viscosity to cast, the photopolymer is applied on a second substrate by means of a dispenser, and is pressed and spread with an another substrate, which is used as a lid, onto the surface of the second substrate so as to form a recording layer.

The photorefractive material (2) is not particularly limited, and can be appropriately selected depending on the intended purpose. For example, the photorefractive material contains a charge-generating material, and a charge-transporting material, and optionally contains other components, if necessary.

The charge-generating material is not particularly limited, and can be appropriately selected depending on the intended purpose. Examples thereof include: phthalocyanine dyes or pigments such as metallo-phthalocyanines, metal-free phthalocyanines, and derivatives thereof; naphthalocyanine dyes or pigments; azo dyes or pigments such as mono-azoic compounds, dis-azoic compounds, and tris-azo compounds; pelylene dyes or pigments; indigo dyes or pigments; quinacridone dyes or pigments; polycyclic quinine dyes or pigments such as anthraquinone, anthanthrone, and cyanine; electric charge transferring complexes composed of electric charge donors and electric charge acceptors, represented as TTF-TCNQ; azulenium salts; fullerenes represented as C50 and C70, and derivatives thereof such as metha-fullerene. They may be used singly or in combination of two or more.

The charge-transporting material is a material which transport holes or electrons, and is either a low-molecular compound or a high-molecular compound.

The charge-transporting material is not particularly limited, and can be appropriately selected depending on the intended purpose. Examples thereof include: nitrogen-including cyclic compounds and derivatives thereof, such as indole, carbazole, oxazole, inoxazole, thiazole, imidazole, pyrazole, oxadiazole, pyrazoline, thiadiazole and triazole; hydrazoline compounds; triphenyl amines; triphenylmethanes; butadienes; stilbenes; quinone compounds and derivatives thereof, such as anthraquinon diphenoquinon; fullerenes and derivatives thereof, such as C60 and C70; π conjugated polymers and oligomers, such as polyacetylene, polypyrrole, polythiophene and polyaniline; σ conjugated polymers and oligomers, such as polysilane and polygermane; and polycyclic aromatic compounds, such as anthracene, pyrene, phenanthrene, and coronene. They may be used singly or in combination of two or more.

As a method for forming a recording layer with the photorefractive material, for example, there is a method wherein the photorefractive material is dissolved and/or dispersed in a solvent to obtain a coating solution, the coating solution is applied to form a coated film, and the solvent is removed from the coated film so as to form a recording layer. There is also a method wherein the photorefractive material is heated so as to fluidize, the fluidized material is coated so as to form a coated film, and the coated film is quenched so as to form a recording layer.

The photochromic material (3) is not particularly limited provided that the material causes a photochromic reaction, and can be appropriately selected depending on the intended purpose. Examples thereof include azobenzenes, stilbenes, indigos, thioindigos, spiropyrans, spirooxazines, fulgides, anthracenes, hydrazones, and cinnamic acids. Amongst of them, the azobenzene derivatives and stilbene derivatives which cause cis-trans isomerization upon radiation of light, and spiropyran derivatives and spirooxazine derivatives which cause ring-opening and closing structural change upon radiation of light.

The chalcogen compound (5) is, for example, a material which contains chalcogenide glass containing chalcogen elements, and metal particles dispersed in the chalcogenide glass wherein the metal particles are formed of a metal which is capable of being diffused in the chalcogenide glass upon radiation of light.

The chalcogenide glass is not particularly limited, provided that it is formed of a non-oxide amorphous material containing chalcogen elements such as S, Te, or Se, and is capable of optical doping of metal particles.

The amorphous material containing the chalcogen elements is preferably a Ge—S glass, an As—S glass, an As—Se glass, an As—Se—Ce glass, or the like. Among them, the Ge—S glass is the most preferable. In the case where the Ge—S glass is used as the calcogenide glass, a ratio of Ge to S is arbitrarily selected depending on a wavelength of the irradiating light, but the preferred is the chalcogenide glass mainly having a chemical formula expressed by $GeS_2$.

The metal particles are not particularly limited provided that they photodope in the chalcogenide glass upon radiation of light, and can be appropriately selected depending on the intended purpose. Examples thereof include Al, Au, Cu, Cr, Ni, Pt, Sn, In, Pd, Ti, Fe, Ta, W, Zn, Ag, and the like. Among them, Ag, Au and Cu are preferable as they easily generate photodoping, and Ag is preferable as it remarkably generates photodoping.

The content of the metal particles dispersed in the chalcogenide glass is preferably 0.1% by volume to 2% by volume, and more preferably 0.1% by volume to 1% by volume with respect to the total volume of the recording layer. In the case where the content of the metal particles is less than 0.1% by volume, the change of transmittance due to photodoping becomes insufficient, and thus the recording quality decreases. In the case where the content of the metal particles is more than 2% by volume, the transmittance of the material forming the recording layer becomes lower, and thus it is difficult to sufficiently generate photodoping.

The forming method of the recording layer can be selected from the conventional method depending on the material which forms the recording layer. Examples thereof include a vapor deposition method, a wet coating method, a MBE (morecular beam epitaxy) method, a cluster ion beam method, a molecular laminate method, a LB method, a printing method, and a transcription method. Amongst of them, the vapor deposition method and the wet coating method are preferred.

The vapor deposition method is not particularly limited, and can be appropriately selected from the conventional methods depending on the intended purpose. Examples thereof include a vacuum vapor deposition method, a resistance heating deposition method, a chemical vapor deposition (CVD) method, and a physical vapor deposition method. Examples of the chemical vapor deposition method include a plasma CVD method, a laser CVD method, a heat CVD method, and a gas source CVD method.

The wet coating method is suitably performed by using (coating and drying) a solution, i.e., coating solution, which contains the material for the recording layer dissolved and/or dispersed therein. The wet coating method is not particularly limited, and can be selected from the conventional methods depending on the indented purpose. Examples thereof include an ink-jet method, a spin-coating method, a kneader-coating method, a bar-coating method, a blade-coating method, a casting method, a dip-coating method, and a curtain-coating method.

The thickness of the recording layer is not particularly limited, and can be selected depending on the intended purpose. The thickness thereof is preferably 1 μm to 1,000 μm, and more preferably 100 μm to 700 μm.

If the thickness of the recording layer is within the aforementioned preferable range, the sufficient S/N ratio can be attained on the shift multiplex of 10 to 300. If the thickness is within the aforementioned more preferred range, such the technical effect becomes significant.

<Filter Layer>

The filter layer is a layer (selective reflection film) which selectively reflects light, namely transmitting a first light, and reflecting a second light which is different from the first light. The filter layer is, for example, an inorganic filter layer which contains a colored material-containing layer, and a dielectric material deposited layer, or an organic filter layer which contains a cholesteric liquid crystal layer.

-Colored Material-Containing Layer-

The colored material-containing layer contains a colored material, a binder resin, and a solvent, and optionally contains other components, if necessary.

-Colored Material-

The colored material contains at least one of pigments and dyes. Among them, red dyes and red pigments are preferable since they absorb the light having a wavelength of 532 nm, but transmitting servo light having a wavelength of 655 nm. Moreover, the red pigments are more preferable.

The red dyes are not particularly limited, and can be selected from the known products depending on the intended purpose. Examples thereof include: acid dyes such as C. I. Acid Reds 1, 8, 13, 14, 18, 26, 27, 35, 37, 42, 52, 82, 87, 89, 92, 97, 106, 111, 114, 115, 134, 186, 249, 254 and 289; basic dyes such as C. I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and reactive dyes such as C. I. Reactive Reds 1, 14, 17, 25, 26, 32, 37, 44, 46, 55, 60, 66, 74, 79, 96 and 97. They may be used singly or in combination of two or more.

The red pigments are not particularly limited, and can be appropriately selected from the known products depending on the intended purpose. Examples thereof include C. I. Pigment Reds 9, 97, 122, 123, 149, 168, 177, 180, 192, 209, 215, 216, 217, 220, 223, 224, 226, 227, 228, 240, C. I. Pigment Red 48:1, Permanent Carmine FBB (C. I. Pigment Red 146), Permanent Ruby FBH (C. I. Pigment Red 11) and Faster Pink B Supra (C. I. Pigment Red 81). They may be used singly or in combination of two or more.

Among them, the especially preferable colored material is a red pigment which shows a transmittance spectrum such that a transmittance of the light having a wavelength of 532 nm is 10% or less and a transmittance of the light having a wavelength of 655 nm is 90% or more.

The content of the colored material is preferably 0.05% by mass to 90% by mass, and more preferably 0.1% by mass to 70% by mass with respect to the total solids content of the colored material-containing layer. In the case where the content is less than 5% by mass, the thickness of the colored material-containing layer needs to be 500 μm or more. In the case where the content is more than 90% by mass, the colored material-containing layer cannot self-supported, and thus the layer may be broken down during the process of forming a colored material-containing layer.

-Binder Resin-

The binder resin is not particularly limited, and can be appropriately selected from the known binders depending on the intended purpose. Examples thereof include polyvinyl alcohol, vinyl chloride-vinyl acetate copolymer, a copolymer of vinyl acetate and at least one selected from vinyl alcohol, maleic acid, and acrylic acid, vinyl chloride-vinyliden chloride copolymer, vinyl chloride-acrylonitrile copolymer, ethylene-vinyl acetate copolymer, a cellulose derivative such as a nitrilocellulose resin, a polyacrylic resin, polyvinyl acetal, polyvinyl butyral, an epoxy resin, a phenoxy resin, polyurethane, polycarbonate and the like. They may be used singly or in combination of two or more.

One or more polar groups are preferably introduced into the aforementioned binder resins so as to further improve dispersibility and durability thereof. The polar group is at least one selected from the group consisting of epoxy groups, $CO_2H$, $OH$, $NH_2$, $SO_3M$, $OSO_3M$, $PO_3M_2$, $OPO_3M_2$. Note that M denotes a hydrogen atom, alkali metal or ammonium, and when more than one M is present in one polar group, those may be identical to or deferent from each other. The content of the polar group is preferably $10^{-6}$ to $10^{-4}$ equivalent with respect to one gram of the binder resin.

The binder resin is preferably subjected to a curing treatment by an addition of the conventional crosslinking agent such as an isocyanate crosslinking agent.

The content of the binder resin is preferably 10% by mass to 99.95% by mass, and more preferably 30% by mass to 99.9% by mass with respect to the total solids content of the colored material-containing layer.

The aforementioned components are dissolved and/or dispersed in a suitable solvent to prepare a coating solution, and the coating solution is applied onto a substrate, which will be described later, in accordance with an arbitrarily selected coating method to thereby form a colored material-containing layer.

The solvent is not particularly limited, and can be appropriately selected from the conventional solvents depending on the intended purpose. Examples thereof include: water; alkoxypropionic acid esters such as methyl-3-methoxypropionate, ethyl-3-methoxypropionate, propyl-3-methoxypropionate, methyl-3-ethoxypropionate, ethyl-3-ethoxypropionate, and propyl-3-ethoxypropionate; alkoxy alcohol esters such as 2-methoxypropylacetate, 2-ethoxypropylacetate, and 3-methoxybutylacetate; lactic acid esters such as methyl lactate and ethyl lactate; ketones such as methyl ethyl ketone, cyclohexanone, and methylcyclohexanone; γ-butyrolactone; N-methylpyrrolidone; dimethylsulfoxide; chloroform; and tetrahydrofuran. They may be used singly or in combination of two or more.

The coating method is not particularly limited, and can be appropriately selected depending on the intended purpose. Examples thereof include an ink-jet method, a spin-coating method, a kneader-coating method, a bar-coating method, a blade-coating method, a casting method, a dip-coating method, a curtain-coating method, and the like.

The thickness of the colored material-containing layer is preferably 0.5 μm to 200 μm, and more preferably 1 μm to 100 μm. If the thickness is less than 0.5 μm, the addition amount of the binder resin may not be enough to coat the colored material and to form a film. If the thickness is more than 200 μm, the thickness of the filter becomes too thick, and thus an excessively large optical system for irradiating light and servo light is required.

-Dielectric Material-Deposited Layer-

The dielectric material-deposited layer is formed on the colored material-containing layer, and is a laminate of two or more dielectric films each having mutually different refractive index. In order to make the filter layer selectively reflective, the dielectric material-deposited layer is preferably a laminate of two or more layer wherein a dielectric film having a high refractive index, and a dielectric film having a low refractive index are alternately disposed. In this case, two deferent dielectric films may be laminated, or more than two deferent dielectric films may be laminated.

A number of the films to be laminated is preferably 2-20, more preferably 2-12, further more preferably 4-10, and especially preferably 6-8. In the case where the number of the films are more than 20, the production efficiency is lowered as a large number of films needs to be deposited, and thus the objects and effects of the present invention may not be achieved.

The lamination order of the dielectric films is not particularly limited, and can be appropriately selected depending on the intended purpose.

For example, a dielectric film of a lower refractive index is deposited first in a case where the adjacent dielectric film has a high refractive index. On the other hand, a dielectric film with a higher refractive index is deposited first in a case where the adjacent dielectric film has a low refractive index. The criteria of refractive index for determining whether a dielectric thin layer has high or low refractive index is preferably set to 1.8. Note, however, that this determination is made on an arbitrary basis. That is, dielectric thin layers with different refractive indices equal to or greater than 1.8 (i.e., there are dielectric thin layers with high and low refractive indices) may be used to form such a laminate.

The material for the dielectric film of a high refractive index is, for example, $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$ $Ta_2O_5$, $TiO_2$, $TlCl$, $Y_2O_3$, $ZnSe$, $ZnS$, $ZrO_2$, or the like. Among the above-listed materials, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferable, and $SiO$, $Ta_2O_5$, $TiO_2$, $Y_2O_3$, $ZnSe$, $ZnS$, and $ZrO_2$, are specially preferable.

The material for the dielectric film of a low refractive index is, for example, $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, or the like. Among the above-listed materials, $Al_2O_3$, $BiF_3$, $CaF_2$, $MgF_2$, $MgO$, $SiO_2$, and $Si_2O_3$ are preferable, and $Al_2O_3$, $CaF_2$, $MgF_2$, $MgO$, $SiO_2$, and $Si_2O_3$ are specially preferable.

The atomic ratio of the material for the dielectric film is not particularly limited, and can be appropriately selected depending on the intended purpose. The atomic ratio is adjusted, for example, by changing the density of the atmospheric gas at the time of forming the film.

The forming method of the dielectric film is not particularly limited, and can be appropriately selected depending on the intended purpose. Examples thereof include: vacuum vapor deposition methods such as an ion-plating method, and an ionic-beam method; physical vapor deposition (PVD) methods such as a sputtering method; and chemical vapor deposition (CVD) methods. Among them, the vacuum vapor deposition method and the sputtering method are preferable, and the sputtering method is the most preferable.

The sputtering method is preferably a DC sputtering method which has a high rate of film formation. In the DC sputtering method, it is preferred that a material of high conductivity is used.

A method for forming a multi-layered film in accordance with the sputtering is, for example, (1) a one-chamber method wherein a film formation is performed by using a plurality of targets alternately or sequentially within one chamber, or (2) a multi-chamber method wherein a film formation is performed continuously in a plurality of chambers. The multicamber method is specially preferred in view of the production efficiency and prevention of the material contamination.

The thickness of the dielectric film is preferably λ/16 to λ, more preferably λ/8 to 3λ/4, and further more preferably λ/6 to 3λ/8 of optical wavelength order.

In the dielectric material-deposited layer, a part of the light propagating through the dielectric material-deposited layer is multiply reflected by each of the dielectric films, the reflected beams of the light are interfered each other, and light only at certain wavelength is selectively transmitted. Such the wavelength is determined by the multiplication of the thickness of the dielectric film and its refractive index. The center transmission wavelength of the dielectric material-deposited layer has an angle dependency to incident light, and thus the transmission wavelength can be changed by varying an incident angle of the light.

Note that, since the number of the laminated layers of the dielectric material-deposited layer is 20 or less, a few to several tens percents of the selective reflection wavelength light is leaked and transmitted through the filter, but the leaked light is absorbed by the colored material-containing layer disposed just under the dielectric material-deposited layer. As the colored material-containing layer contains red pigments or red dyes, the colored material-containing layer absorbs a first light having a wavelength of 350 nm to 600 nm, but transmits the light having a wavelength of 600 nm to 900 nm, which is used for servo light.

The filter layer containing the colored material-containing layer and the dielectric material-deposited layer is preferably configured to transmit the first light having a certain wavelength, and to reflect the second light having another wavelength. The aforementioned wavelength of the first light is preferably 600 nm to 900 nm, and aforementioned wavelength of the second light is preferably 350 nm to 600 nm. To achieve this function, the optical recording medium has a structure such that the recording layer, the dielectric material-deposited layer, the colored material-containing layer, and the servo-pit pattern are disposed in this order from the side where an optical system is arranged.

The thickness of the inorganic filter layer is preferably 0.5 μm to 200 μm, and more preferably 1 μm to 100 μm.

-Cholesteric Liquid Crystal Layer-

The cholesteric liquid crystal layer contains at least one of a nematic liquid crystal compound, and a chiral compound, and optionally contains a polymerizable monomer and other components, if necessary.

The cholesteric liquid crystal layer is a single layer, or a laminate of two or more layers. The cholesteric liquid crystal layer is preferably a laminate of two to ten layers. If the number of layers to be laminated is more than 10, the production efficiency is lowered in terms of coatings, and thus the objects and effects of the present invention may not be achieved.

The cholesteric liquid crystal layer is preferably a layer which has a property to selectively separate a certain circularly polarized light from a light flax. The cholesteric liquid crystal layer having such property reflects the only circularly polarized light which has the same direction of the circular polarization to the spiral direction (clockwise or anti-clockwise) of the liquid crystal, and has the wavelength corresponding to the spiral pitch of the liquid crystal. By utilizing this selective reflection property of the cholesteric liquid crystal layer, the cholesteric crystal liquid crystal layer selectively transmit the certain circularly polarized light from the natural light of a certain wavelength range, and reflects the rest of the light.

Accordingly, the cholesteric liquid crystal layer is preferably configured to transmit a light having a certain wavelength, and to reflect a circularly polarized light having another wavelength. The aforementioned wavelength of the first light is preferably 600 nm to 900 nm, and the aforementioned wavelength of the second light is 350 nm to 600 nm.

The selective reflection property of the cholesteric liquid crystal layer is effective to a certain range of the wavelength, and it is difficult to cover the whole range of the visible light. Namely, the selective reflection wavelength range Δλ of the cholesteric liquid crystal layer is expressed by the following equation 1:

$$\Delta\lambda = 2\lambda(ne-no)/(ne+no) \qquad \text{Equation 1}$$

In the equation 1, "no" denotes a reflectance of the nematic liquid crystal molecular contained in the cholesteric liquid crystal layer with respect to an ordinary light, "ne" denotes a reflectance of the nematic liquid crystal molecular with respect to an extraordinary light, and "λ" denotes a center wavelength of the selective reflectance.

As shown with the equation 1, the selective reflection wavelength range Δλ depends on the molecular structure of the nematic liquid crystal. According to the equation 1, the selective reflection wavelength range Δλ can be widen by increasing the value of (ne−no). However, (ne−no) is generally 0.3 or less, and when it is more than 0.3, the functions as a liquid crystal, such as orientation abilities, liquid crystal phase transition temperature, and the like becomes insufficient, and thus it is not suitable for a practical use. Therefore, the selective reflection wavelength range Δλ of the cholesteric liquid crystal layer is approximately 150 nm at maximum, and is preferably 30 nm to 100 nm.

The center wavelength λ of the selective reflectance is expressed by the following equation 2:

$$\lambda = (ne+no)P/2 \qquad \text{Equation 2}$$

In the equation 2, "ne" and "no" denote the same as in the equation 1, and P denotes a spiral pitch length required for one spiral twist in the cholesteric liquid crystal layer.

As shown with the equation 2, the center wavelength λ of the selective reflectance depends on the birefringence magnitude Δn and average spiral pitch P of the cholesteric liquid crystal layer provided that the average spiral pitch P is constant. In order to widen the selective reflection wavelength range, it is therefore preferable that the center wavelengths λ of each laminated layers of the cholesteric liquid crystal layer are mutually different, and the spiral directions (clockwise or anti-clockwise) of the laminated layers are identical.

The selective reflection wavelength ranges of the laminated layers are preferably continuous in order to attain a uniform reflectance within these ranges. Note that "continuous" means that there is no gap between the selective reflection wavelength ranges, and the reflectance within these ranges is substantially 40% or more.

Therefore, the distance between the center wavelengths λ of the laminated layers are within such a range that the selective reflection wavelength ranges thereof become continuous.

The cholesteric liquid crystal layer is a laminate of a base and a cholesteric liquid crystal layer to form a filter for the optical recording medium as explained below, or a laminate of a substrate and the filter for the optical recording medium. The cholesteric liquid crystal layer may be directly disposed on the aforementioned substrate.

[Filter for Optical Recording Medium]

The filter for the optical recording medium is a laminate of a base and single or multi layered cholesteric liquid crystal layer disposed on the base. The optical characteristics of the filter can be appropriately selected depending on the intended purpose. For example, the reflectance is preferably 40% or more with respect to $\lambda_0-\lambda_0/\cos 20°$ which is a range of ±20° when the incident angle is set as 0°, and is more preferably 40% or more with respect to $\lambda_0-\lambda_0/\cos 40°$ which is a range of ±40° when the incident angle is set as 0°. Note that $\lambda_0$ denotes a wavelength of the irradiating light.

If the reflectance is 40% or more at $\lambda_0-\lambda_0/\cos 20°$, preferably at $\lambda_0-\lambda_0/\cos 40°$, the angle dependency of the irradiating light can be reduced, and thus any optical system which is generally used for the conventional optical recording medium can be utilized.

Figure 8:
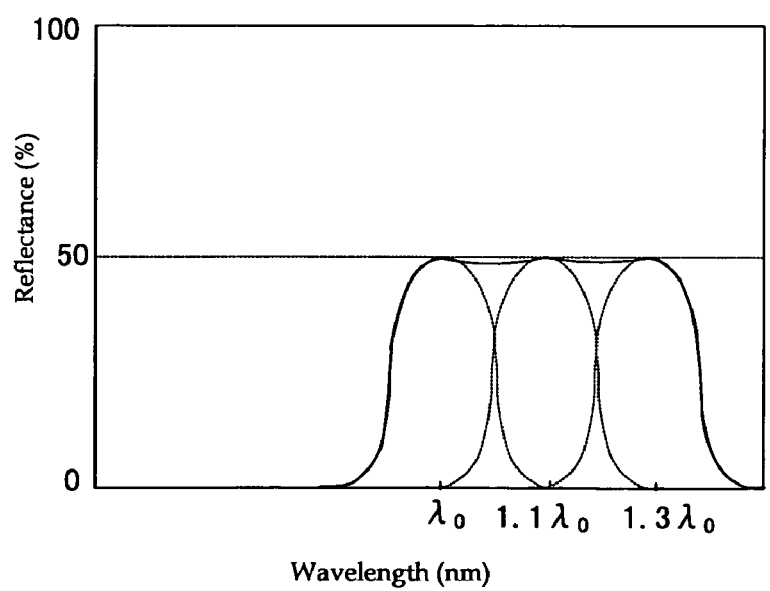
FIG. 8 is a graph showing a reflectance of a laminate of three cholesteric liquid crystal layers.
Figure 9:
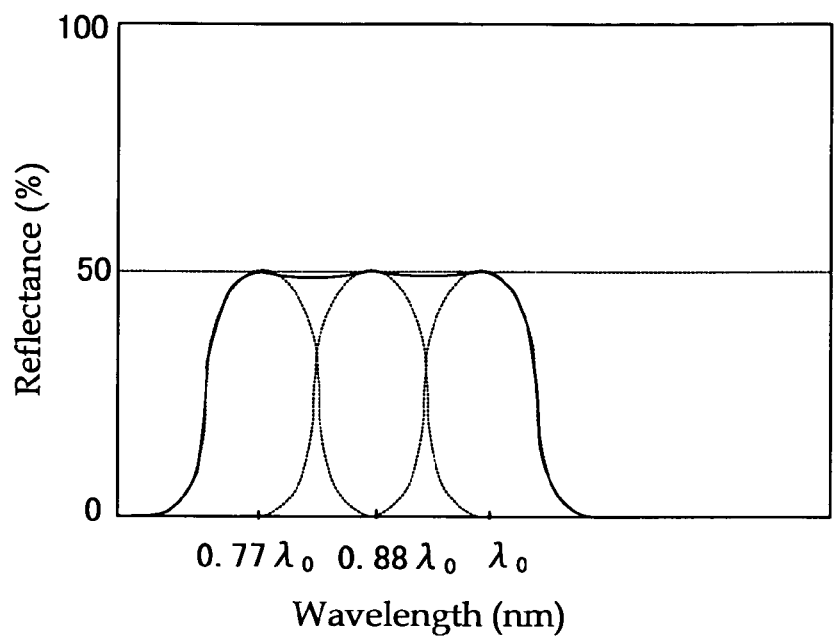
FIG. 9 is a graph showing a reflectance of a laminate of three cholesteric liquid crystal layers.

Specifically, if three cholesteric liquid crystal layers having mutually different center wavelengths of selective reflection and identical spiral rotations are laminated, a filter for an optical recording medium exhibiting reflectance as shown in FIG. 8 can be obtained. FIG. 8 shows that the reflectance is 40% or more with respect to the irradiating light from normal direction (0°). If the incident light is irradiated with an angle, the selective reflection wavelength range is sifted to the shorter wavelength side. When the incident light is inclined at 40° in the cholesteric liquid crystal layer, the filter has a reflectance as shown in FIG. 9.

Figure 10:
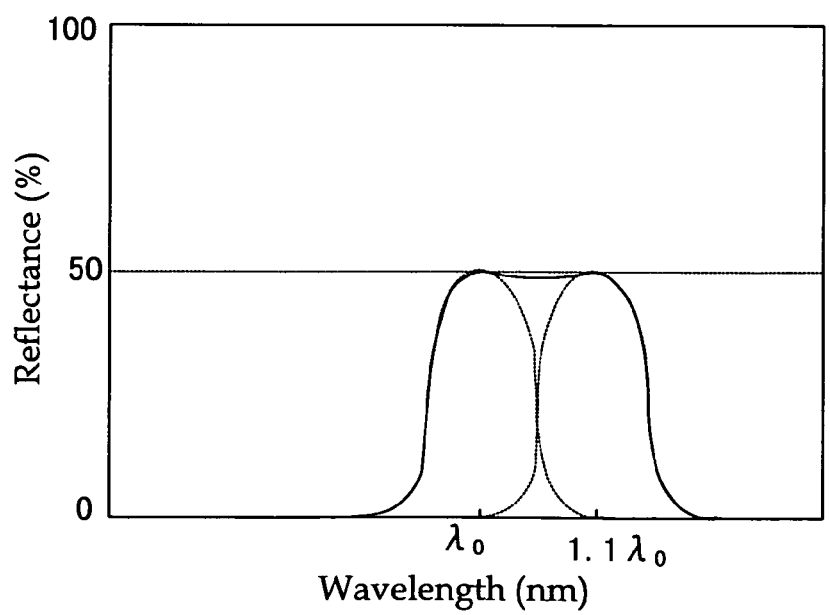
FIG. 10 is a graph showing a reflectance of a laminate of two cholesteric liquid crystal layers.
Figure 11:
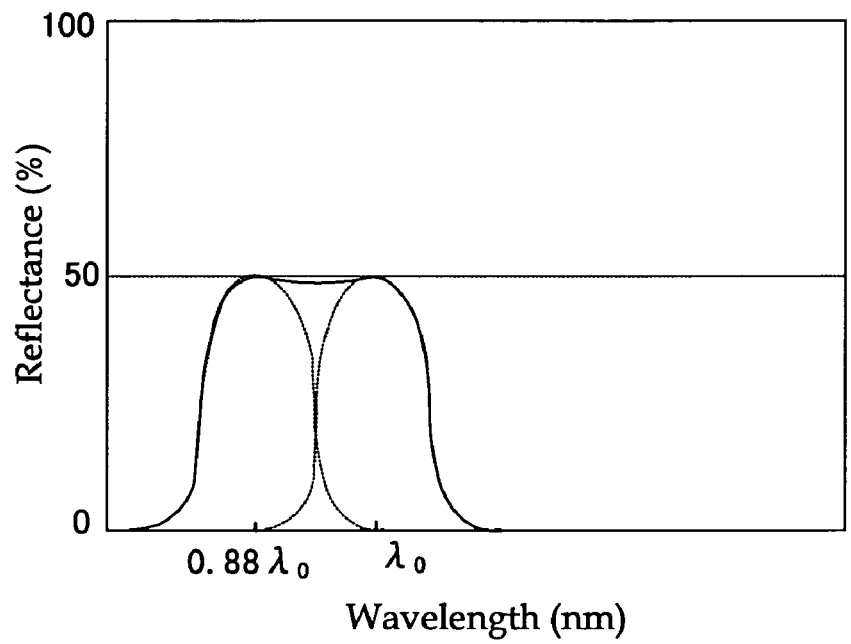
FIG. 11 is a graph showing a reflectance of a laminate of two cholesteric liquid crystal layers.

Similarly, if two cholesteric liquid crystal layers having mutually different center wavelengths of selective reflection and identical spiral rotations are laminated, a filter for an optical recording medium exhibiting reflectance as shown in FIG. 10 can be obtained. FIG. 10 shows that the reflectance is 40% or more with respect to the irradiating light from normal direction (0°). If the incident light is irradiated with an angle, the selective reflection wavelength range is sifted to the shorter wavelength side. When the incident light is inclined at 20° in the cholesteric liquid crystal layer, the filter has a reflectance as shown in FIG. 11.

With respect to the reflection range of from $\lambda_0$ to 1.3 $\lambda_0$ shown in FIG. 8, 1.3 $\lambda_0$ is 692 nm when $\lambda_0$ is 532 nm, and thus the servo light is reflected if the servo light has a wavelength of 655 nm. The range of $\lambda_0$ to 1.3 $\lambda_0$ is applicability for the incident light having an incident angle of ±40° with respect to the filter for an optical recording medium. In the case where the incident light has such a large incident angle, the servo control is suitably performed without causing any problem, provided that the servo light having an incident angle of ±20° is masked. If each cholesteric liquid crystal layers for used in the filter layer is designed to have a large reflective index, the incident angle within the filter for an optical recording medium can be easily designed to be within ±20°. In such a case, the filter layer can be composed by laminating two layers of the cholesteric liquid crystal layer of $\lambda_0$ to 1.1 $\lambda_0$ shown in FIG. 10, and thus there is no problem in transmitting the servo light.

From the results shown in FIGS. 8-11, the filter for an optical recording medium maintains a refractive index of 40% or more with respect to an incident light having an incident angle of 0°-20°, preferably 0°-40°. Accordingly, the filter for an optical recording medium has no problem in recording a signal.

Each of the cholesteric liquid crystal layers to be laminated is not particularly limited provided that the aforementioned characteristics are attained, and can be appropriately selected depending on the intended purpose. Each cholesteric liquid crystal layer contains a nematic liquid crystal compound and a chiral compound, and optionally contains a polymerizable monomer and other components, if necessary.

The number of cholesteric liquid crystal layers to be laminated is preferably two or more, and more preferably four to ten. In the case where the number of the laminated layers is less than 4, the selective reflection wavelength is sifted to a shorter wavelength side as an incident angle increases, and thus the selective reflection of the predetermined wavelength may not be carried out. In the case where the number of the laminated layer is more than 10, the production efficiency is lowered in terms of the coating, and thus the objects and effects of the present invention may not be achieved.

The cholesteric liquid crystal layer is preferably a layer which has a property to selectively separate a certain circularly polarized light from a light flax. The cholesteric liquid crystal layer having such property reflects the only circularly polarized light which has the same direction of the circular polarization to the spiral direction (clockwise or anti-clockwise) of the liquid crystal, and has the wavelength corresponding to the spiral pitch of the liquid crystal. By utilizing this selective reflection property of the cholesteric liquid crystal layer, the cholesteric crystal liquid layer selectively transmit the certain circularly polarized light from the natural light of a certain wavelength range, and reflects the rest of the light.

Accordingly, the cholesteric liquid crystal layer is preferably configured to transmit a light having a certain wavelength, and to reflect a circularly polarized light having another wavelength. The aforementioned wavelength of the first light is preferably 600 nm to 900 nm, and the aforementioned wavelength of the second light is 350 nm to 600 nm.

-Nematic Liquid Crystal Compound-

The nematic liquid crystal compound solidify its liquid crystal phase at the liquid crystal phase transition temperature or lower. The nematic liquid crystal compound is appropriately selected from liquid crystal compounds having a reflectance anisotropy Δn of 0.10-0.40, high molecular liquid crystal compounds, and polymerizable liquid crystal compounds. The nematic liquid crystal compound can be used as a solid phase, by aligning while in the liquid crystal state by means of an orientation plate subjected to the rubbing treatment, and then cooling to solidify.

The nematic liquid crystal compound is not particularly limited, and can be appropriately selected depending on the intended purpose. Examples thereof include the compounds expressed by the following structural formulae:

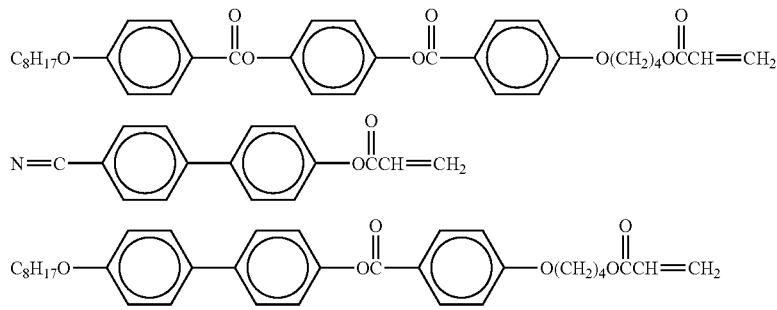

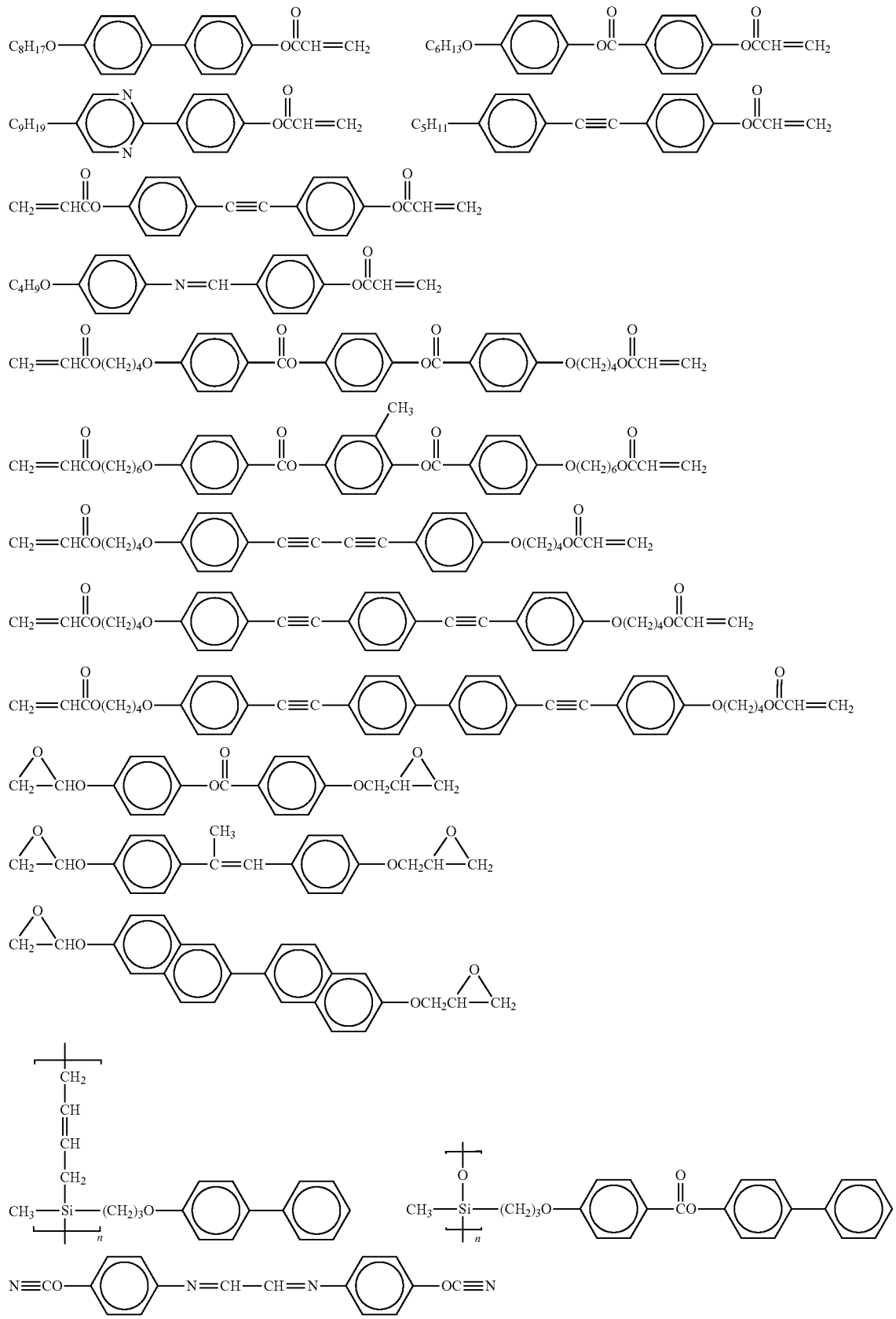

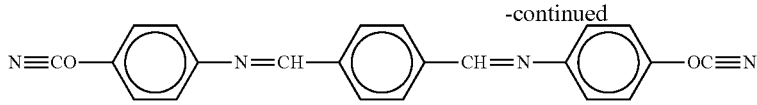

In the above structural formulae, "n" denotes an integer of 1 to 1,000. In the compounds of above structural formulae, their side chain bonding groups can be suitably changed to ones expressed by the following formulae:

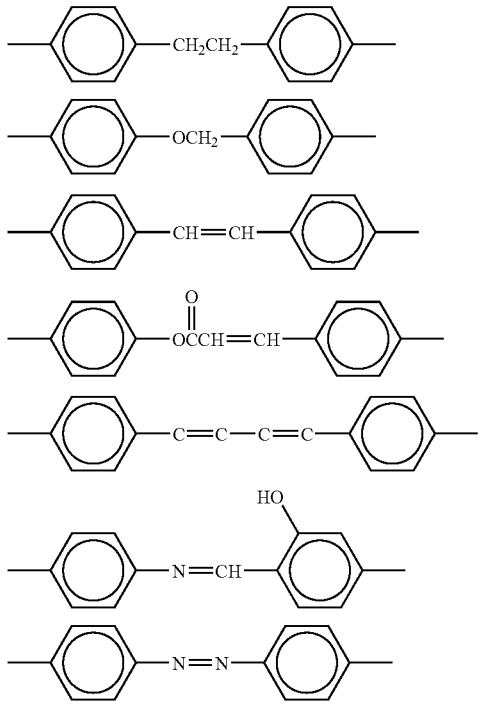

-continued

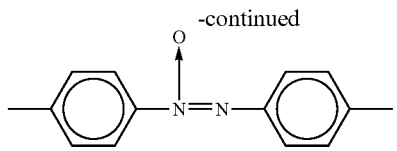

Among the above-listed compounds, the nematic liquid crystal compounds having a polymerizable group in their molecular structure in view of attaining a sufficient curability are preferable. Among them, UV polymerizable liquid crystals are more preferably. The UV polymerizable liquid crystal may be selected from the commercially available products, and examples thereof include PALIOCOLOR LC242 [product name] manufactured by BASF AG, E7 [product name] manufactured by Merck & Co., Inc., LC-Silicon-CC3767 [product name] manufactured by Wacker-Chemie AG, and L35, L42, L55, L59, L63, L79 and L83 [product names] manufactured by Takasago International Corp.

The content of the nematic liquid crystal compound is preferably 30% by mass to 99% by mass, and more preferably 50% by mass to 99% by mass with respect to the total solids mass of each of the laminated cholesteric liquid crystal layers. In the case where the content is less than 30% by mass, the orientation of the nematic liquid crystal compound may become insufficient.

-Chiral Compound-

The chiral compound is not particularly limited, and can be appropriately selected from the known compounds depending on the intended purpose. The chiral compound is preferably an isomannide compound, a catechine compound, an isosorbide compound, a fenchone compound, or a carvone compound in view of improving hue and color purity of the liquid crystal compound. Other than the above-listed compounds, examples thereof include compounds expressed by the following structural formulae:

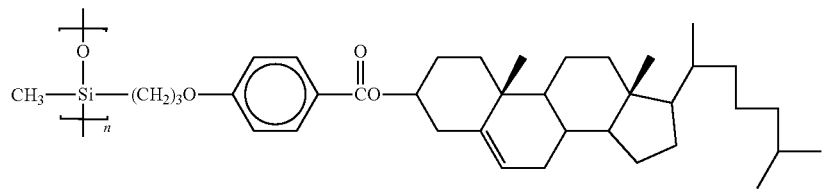

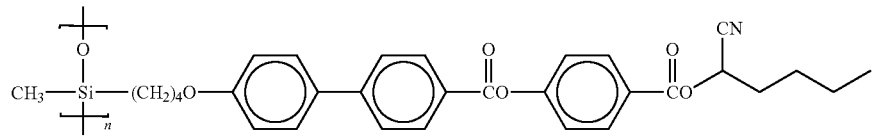

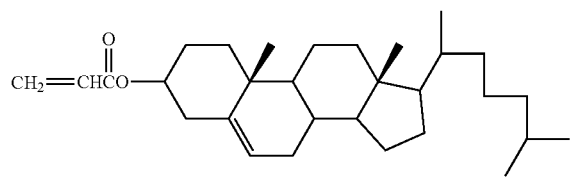

-continued

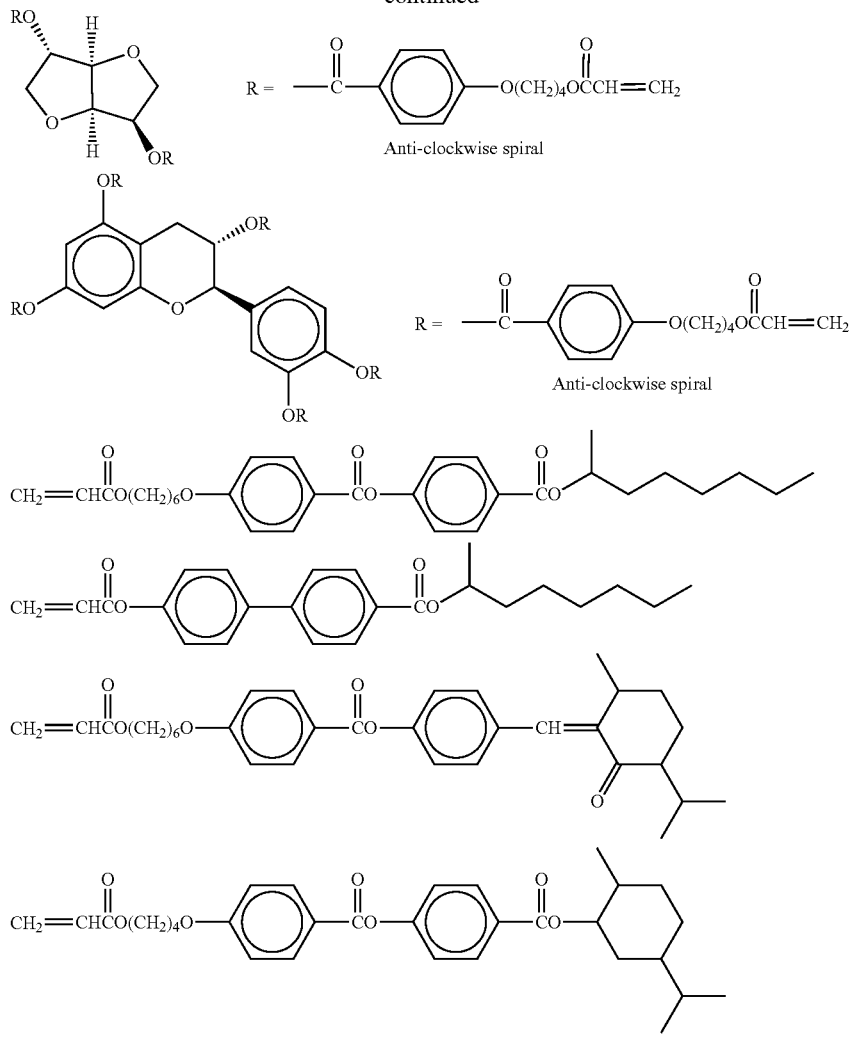

They may be used singly or in combination of two or more.

The chiral compound may be selected from the commercially available products, and examples thereof include S101, R811, and CB15 [product names] manufactured by Merck & Co., Inc., PALIOCOLOR LC756 [product name] manufactured by BASF AG, and the like.

The content of the chiral compound is preferably 30% by mass or less, and more preferably 20% by mass or less, with respect to the total solids mass of each of the laminated cholesteric liquid crystal layers. In the case where the content is more than 30% by mass, the orientation of the cholesteric crystal layer may become insufficient.

-Polymerizable Monomer-

The cholesteric liquid crystal layer optionally contains a polymerizable monomer, for example, for the purpose of improve a curing degree such as a film strength. For example, after irradiating light so as to change (to pattern) the spiral of the liquid crystal, e.g., forming a distribution of the selective reflection wavelength, the spiral structure (selective reflection property) thereof is fixed. By adding the polymerizable monomer in the cholesteric liquid crystal layer, the strength of the fixed cholesteric liquid crystal layer is improved. In the case where the liquid crystal compound has a polymerizable group in its molecular structure, it is however not necessary to add the polymerizable monomer.

The polymerizable monomer is not particularly limited, and can be appropriately selected from the known monomers depending on the intended purpose. Examples thereof include monomers having ethyleny unsaturated bonds therein. Specific examples thereof include polyfunctional monomers such as pentaerythritol tetraacrylate, dipentaerythritol hexaacrylate, and the like.

The specific examples of the monomer having an ethyleny unsaturated bond are compounds expressed by the following structural formulas:

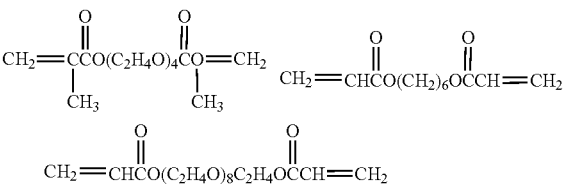

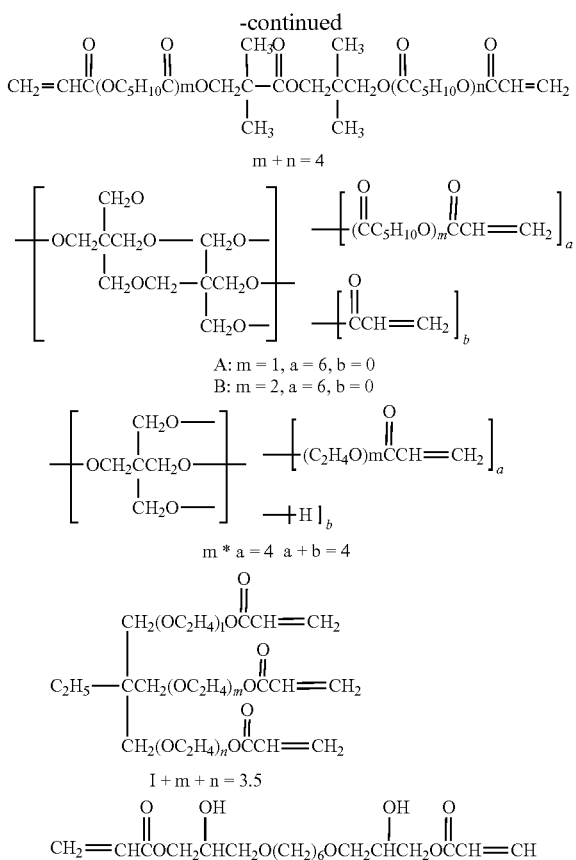

They may be used singly or in combination of two or more.

The content of the polymerizable monomer is preferably 50% by mass or less, and more preferably 1% by mass to 20% by mass with respect to the total solids mass of each of the laminated cholesteric liquid crystal layers. In the case where the content is more than 50% by mass, the orientation of the cholesteric liquid crystal layer may be adversely affected.

-Other Components-

The aforementioned other components are nor particularly limited, and can be appropriately selected depending on the intended purpose. Examples thereof include a photopolymerization initiator, a sensitizer, a binder resin, a polymerization inhibitor, a solvent, a surfactant, a thickener, a dye, a pigment, a UV absorber, a gelling agent, and the like.

The photopolymerization initiator is not particularly limited, and can be appropriately selected from the known products depending on the intended purpose. Examples thereof include p-methoxyphenyl-2,4-bis(trichloromethyl)-s-triazine, 2-(p-buthoxystyryl)-5-trichloromethyl-1,3,4-oxadiazole, 9-phenylacridine, 9,10-dimethylbenzphenazine, benzophenone and Michler's ketone mixture, hexaarylbiimidazole and mercaptobenzoimidazole mixture, and benzyldimethylketal, thioxanthone and amine mixture are available. They may be used singly or in combination of two or more.

The photopolymerization initiator may be selected from the commercially available products. Examples thereof include IRGA CUREs 907, 369, 784, and 814 [product names] manufactured by Ciba Specialty Chemicals KK, Lucirin TPO [product name] manufactured by BASF AG.

The content of the photopolymerization initiator is preferably 0.1% by mass to 20% by mass, and more preferably 0.5% by mass to 5% by mass with respect to the total solids mass of each of the laminated cholesteric crystal liquid layers. In the case where the content is less than 0.1% by mass, it may take a long time to cure at the time of radiation since the curing efficiency is low. In the case where the content is more than 20% by mass, the light transmittance becomes low from the ultraviolet light range to the visible light range.

The sensitizer is optionally added in order to increase the curing degree of the cholesteric liquid crystal layer.

The sensitizer is not particularly limited, and can be appropriately selected from the known sensitizers depending on the intended purpose. Examples thereof include diethylthioxanthone, isopropylthioxanthone, and the like.

The content of the sensitizer is preferably 0.001% by mass to 1% by mass with respect to the total solids mass of each of the laminated cholesteric liquid crystal layers.

The binder resin is not particularly limited, and can be appropriately selected from the known resins depending on the intended purpose. Examples thereof includes: polyvinyl alcohols; polystyrene compounds such as polystyrene and poly-α-methylstyrene; cellulose resins such as methylcellulose, ethylcellulose and acetylcellulose; acidic cellulose derivatives including carboxyl group on the side chains; acetal resins such as polyvinyl formal and polyvinyl butyral; copolymers such as methacrylic acid copolymer, acrylic acid copolymer, itaconic acid copolymer, crotonic acid copolymer, malleic acid copolymer, partial-esterified malleic acid copolymer; homopolymers of acrylic acid alkylester or homopolymers of methacrylic acid alkyl ester; and other polymers containing a hydroxyl group. They may be used singly or in combination of two or more.

Examples of the alkyl group in the homopolymers of acrylic acid alkylester or homopolymers of methacrylic acid alkyl ester include a methyl group, an ethyl group, a n-propyl group, a n-butyl group, an iso-butyl group, a n-hexyl group, a cyclohexyl group, a 2-ethylhexyl group, and the like.

Examples of the above-listed other polymers containing a hydroxyl group include an acrylate copolymer of benzyl (meth)acrylate and a methacrylic acid homopolymer, and a multi-component copolymer benzyl(meth)acrylate, (meth)acrylic acid, and other monomers.

The content of the binder resin is preferably 80% by mass or less, and preferably 50% by mass or less, with respect to the total solids mass of each of the laminated cholesteric liquid crystal layers. In the case where the content is more than 80% by mass, the orientation of the cholesteric liquid crystal layer may not be sufficient.

The polymerization inhibitor is not particularly limited, and can be appropriately selected depending on the intended purpose. Examples thereof include hydroquinone, hydroquinone monoethylether, phenothiazine, benzoquinone and derivatives thereof.

The content of the polymerization inhibitor is preferably 10% by mass or less, and more preferably 0.01% by mass (100 ppm) to 1% by mass with respect to the total solids mass of each of the laminated cholesteric liquid crystal layers.

The solvent is not particularly limited, and can be appropriately selected from the known solvents depending on the intended purpose. Examples thereof include: alkoxypropionic acid esters such as methyl-3-methoxypropionate, ethyl-3-methoxypropionate, propyl-3-methoxypropionate, methyl-3-ethoxypropionate, ethyl-3-ethoxypropionate, and propyl-3-ethoxypropionate; alkoxy alcohol esters such as 2-methoxypropylacetate, 2-ethoxypropylacetate, and 3-methoxybutylacetate; lactic acid esters such as methyl-lactate and ethyl-lactate; ketones such as methyl ethyl ketone, cyclohexanone, and methylcyclohexanone; γ-butyrolactone;

N-methylpyrrolidone; dimethylsulfoxide; chloroform; and tetrahydrofuran. They may be used singly or in combination of two or more.

As a method for forming the filter for an optical recording medium as the filter layer, the filter is suitably formed in accordance with the method for forming an optical recording medium of the present invention which will be described later. For example, each cholesteric liquid crystal layer is formed by coating a coating liquid for the liquid crystal layer prepared with the aforementioned solvent on the base in accordance with the appropriately selected coating method.

As the most production efficient method, the following process is preferred. The base is wound in a roll shape in advance, and the coating liquid is applied on the base with a long pitched continuous coater, such as a bar coater, a die coater, a blade coater, and a curtain coater.

The thickness of each cholesteric liquid crystal layer is preferably 1 μm to 10 μm, and more preferably 2 μm to 7 μm. In the case where the thickness is less than 1 μm, the selective reflectance is not sufficient. In the case where the thickness is more than 10 μm, the uniform orientation of the liquid crystal layer is disturbed.

The thickness of the filter for an optical recording medium (the total thickness of the cholesteric liquid crystal layers excluding the thickness of the base) is preferably 1 μm to 30 μm, and more preferably 3 μm to 10 μm.

Each of the cholesteric liquid crystal layers is not particularly limited, and can be appropriately selected depending on the intended purpose. Preferable examples thereof include one wherein the coating liquid for each of the cholesteric liquid crystal layers is applied onto the base, orientated, solidified, cut into a disk shape with the base, and disposed on the second substrate. In the case where the filter layer is formed directly on the optical recording medium without using a filter for an optical recording medium, it is disposed directly on the second substrate, without disposing a base therebetween.

The filter for an optical recording medium as the filter layer is widely applicable for various fields, and is suitably used in the formation and/or manufacturing of a holographic optical recording medium. Especially, the filter for an optical recording medium is preferably used in the holographic optical recording medium, the method for forming the same, the optical recording method, and the optical reproducing method of the present invention described hereinafter.

-Base-

The base is not particularly limited in terms of its shape, structure, size and the like, and can be appropriately selected depending on the intended purpose. The shape of the base is, for example, a plate or a sheet, the structure thereof is a single layered structure or a laminate structure, and the size is appropriately adjusted depending on the size of the filter layer or filter for an optical recording medium and the like.

The material of the base is not particularly limited, and can be selected from inorganic materials and organic materials.

Examples of the inorganic material include a glass, a quartz glass, silicone, and the like.

Examples of the organic material include acetate resins such as triacetyl cellulose, polyester resins, polyethersulfone resins, polysulfone resins, polycarbonate resins, polyamide resins, polyimide resins, polyolefin resins, acrylic resins, polynorbomene resins, cellulose resins, polyarylate resins, polystyrene resins, polyvinylalcohol resins, polyvinylchloride resins, polyvinylidenechloride resins, polyacrylic resins, and epoxy resins. Among them, polycarbonate resin, acrylic resin, triacetylcellulose resin, and polyolefin resin are preferable. They may be used singly or in combination of two or more.

The base may be appropriately synthesized or selected from the commercially available products.

The thickness of the base is not particularly limited, and can be appropriately selected depending on the purpose. For example, the thickness thereof is preferably 10 μm to 500 μm, and more preferably 50 μm to 300 μm. In the case where the thickness of the base is less than 10 μm, the adhesion thereof is lowered due to the bending of the substrate. In the case where the thickness of the base is more than 500 μm, it is necessary to widely sift the focus point of the information light and the reference light, and thus a size of the optical system becomes large.

<First Substrate>

The first substrate is not particularly limited in terms of its shape; structure, size or the like, and can be appropriately selected depending on the intended purpose. Examples of the shape thereof include a disk-shape, a card-shape, and the like. The material for the substrate should be selected from materials which can maintain a physical strength of the optical recording medium. In the case where the recording light (the information light and/or the reference light) or the reproduction light (the reference light for reproducing) is irradiated through the substrate, the substrate needs to be sufficiently transparent at the wavelength range of the light to be applied.

The material of the first substrate is generally selected from a glass, ceramics, resins, and the like. The resin is particularly preferable in view of the molding capability, and cost performance.

Examples of the resin include a polycarbonate resin, an acrylic resin, an epoxy resin, a polystyrene resin, acrylonitrilstyrene copolymer, a polyethylene resin, a polypropylene resin, a silicone resin, a fluorine resin, an ABS resin, a urethane resin, and the like. Among these resins, the polycarbonate resin and the acrylic resin are preferable in view of the molding capability, optical properties, and cost performance.

The first substrate can be the one arbitrary synthesized, or selected from the commercially available products.

The thickness of the first substrate is not particularly limited, and can be appropriately selected depending on the intended purpose. The thickness is preferably 0.1 mm to 5 mm, and more preferably 0.3 mm to 2 mm. When the thickness is less than 0.1 mm, the distortion in the shape of the disk may not be prevented at the time of being stored. When the thickness is more than 5 mm, the weight of the disk itself becomes large, and thus excessive load may be applied on the drive motor.

<Second Substrate>

The second substrate may be identical to or different from the first substrate in terms of its shape, structure, size, material, and thickness. The second substrate preferably has the same shape and size to those of the first substrate.

With the second substrate, address-servo area as multiple address fixing area linearly extended toward the radius direction is arranged with certain periodic angle, and a sector section between adjoining address-servo area is arranged for the data area. In address-servo area, an information for the focusing servo and tracking servo with sampled servo method and an address information are recorded with emboss pit (servo pit) in advance (pre-formatted). Besides, a focusing servo can be carried out with the surface of the reflective film. As information for the tracking servo, for example, wobble pit and groove are available. Besides, in the case where the optical recording medium is card shape, the servo pit pattern is not required.

-Reflective Film-

The reflective film is formed on the surface of the servo pit pattern of the second substrate.

The material of the reflective film is preferably a material having a high reflectance to the information light and the reference light. In the case where the wavelength of the light to be applied is 400 nm to 780 nm, the material of the reflective film is preferably Al, an Al alloy, Ag, an Ag alloy, or the like. In the case where the wavelength of the light to be applied is more than 650 nm, the material of the reflective film is preferably Al, an Al alloy, Ag, an Ag alloy, Au, a Cu alloy, TiN, or the like.

The reflective film functions, as well as reflecting the light, to record and rewrite directory information without adversely affecting the recorded hologram, by means of an optical recording medium capable of writing or erasing, such as a digital video disk (DVD). Such the directory information includes, for example, an information regarding the area the hologram has been recorded, when it has been rewritten, in which area an error has existed, and how an alternating process has been performed.

The forming method of the reflective film is not particularly limited, and can be appropriately selected depending on the intended purpose. Examples thereof include a vacuum deposition method, a sputtering method, a plasma CVD method, a photo CVD method, an ion plating method, an electron beam vapor deposition method, and the like. Among them, the sputtering method is preferable in view of the production efficiency, and quality of the formed film.

The thickness of the reflective film is preferably 50 nm or more so as to realize sufficient reflectance, and more preferably 100 nm or more.

<Other Layers>

Other layers are not particularly limited, and can be appropriately selected depending on the intended purpose. Examples thereof include a first gap layer, a second gap layer, and the like.

-First Gap Layer-

The first gap layer is optionally disposed between the filter layer and the reflective film for the purpose of smoothing the surface of the second substrate. It is also effective in controlling the size of the hologram formed in the recording layer. Specifically, it is necessary to control the size of the interference region of the reference light and the information light for recording at a certain size in the recording layer, it is effective to dispose a gap between the recording layer and the servo pit pattern.

The first gap layer is formed, for example, by coating a material, such as a UV curable resin, on the servo pit pattern in accordance with a spin coating method or the like, and curing the coated material. Moreover, when the filter layer is coated and formed on a transparent base, the transparent base functions as the first gap layer.

The thickness of the first gap layer is not particularly limited, and can be appropriately selected depending on the intended purpose. The thickness thereof is preferably 1 μm to 200 μm.

-Second Gap Layer-

The second gap layer is optionally disposed between the recording layer and the filter layer.

The material of the second gap layer is not particularly limited, and can be appropriately selected depending on the intended purpose. Examples thereof include transparent resin films, such as triacetylcellulose (TAC), polycarbonate (PC), polyethyleneterephthalate (PET), polystyrene (PS), polysulfone (PSF), polyvinylalcohol (PVA) and polymethylmethacrylate (PMMA), and norbornene resin films such as ARTON [product name, manufactured by JSR Corp.], and ZEONOA [product name, manufactured by Zeon Corp]. Among them, the materials having high isotropy are preferable, and TAC, PC, ARTON [product name] and ZEONOA [product name] are more preferable. Moreover, the second gap layer can be formed with a UV curable resin, a thermosetting resin, or a two-component curable resin.

The forming method thereof is not particularly limited, and can be appropriately selected depending on the intended purpose. Examples thereof include a spin coating, a screen printing, and the like.

The thickness of the second gap layer is not particularly limited, and can be appropriately selected depending on the purpose. The thickness thereof is preferably 1 μm to 200 μm.

Hereinafter, the concrete examples of the embodiments of the present invention are described in details with reference to the drawings.

First Embodiment

Figure 12:
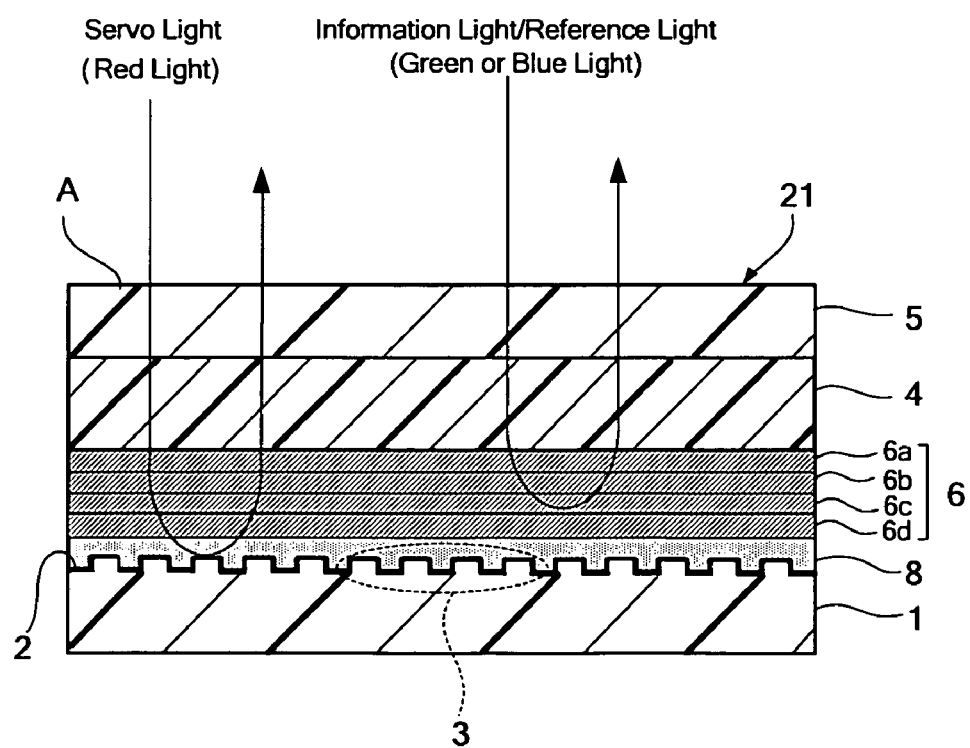
FIG. 12 is a schematic cross-sectional diagram showing an example of the optical recording medium according to the first embodiment of the present invention.

FIG. 12 is a schematic cross-sectional view showing the structure of the optical recording medium 21 of the first embodiment of the present invention. In an optical recording medium 21 according to the first embodiment, a servo pit pattern 3 is formed on a substrate 1 made of polycarbonate resin or glass, and the serve pit pattern 3 is coated with Al, Au, Pt or the like to form a reflective film 2. Although the servo pit pattern 3 is formed on the entire surface of the second substrate 1 in FIG. 12, it may be formed on the second substrate 1 periodically. In addition, the height of the servo pit pattern 3 is 175 nm (1,750 Å) at maximum, which is far smaller than those of the other layers, including substrates.

A first gap layer 8 is formed by applying a UV curable resin or the like on the reflective film 2 of the second substrate 1 by spin coating or the like. The first gap layer 8 is effective for protecting the reflective film 2 and for adjusting the size of holograms created in a recording layer 4. Specifically, since somewhat large regions where optical interference between information light and recording reference light takes place need to be secured in the recording layer 4, it is effective to provide a gap between the recording layer 4 and the servo pit pattern 3.

A filter layer 6 is provided on the first gap layer 8, and the recording layer 4 is sandwiched between the filter layer 6 and a first substrate 5 (a polycarbonate resin substrate or glass substrate) to constitute the optical recording medium 21.

In FIG. 12, the filter layer 6 admits only red light and reflects light of the other colors. Therefore, the information light and the reference light for recording and reproducing do not pass through the filter layer 6 because they are light of green or blue, and never reach the reflective film 2, becoming returning light emitting from the light entrance/exit surface A.

The filter layer 6 is a laminate of four cholesteric liquid crystal layers 6a, 6b, 6c and 6d. The filter layer 6 may be directly provided on the first gap layer 8 with a coating method, or may be provided by stamping a film in which four cholesteric liquid crystal layers are laminated on a base into the optical disc shape.

The optical recording medium 21 of the first embodiment may be in a disc shape or card-like shape. There is no need to provide a servo pit pattern in a case where the optical recording medium 21 is a card-like shape. In the optical recording medium 21, the second substrate 1 is 0.6 mm in thickness, the first gap layer 8 is 100 μm in thickness, the filter layer 6 is 2 μm to 3 μm in thickness, the recording layer 4 is 0.6 mm in thickness, and the first substrate 5 is 0.6 mm in thickness, bringing to the total to about 1.9 mm.

Next, optical operations around the optical recording medium 21 will be described with reference to FIG. 14.

First, a red light beam emitted from the servo laser source is reflected by a dichroic mirror 13 by almost 100%, and passes through an objective lens 12. By this, the servo light is applied onto the optical recording medium 21 in such a way that it focuses on the reflective film 2. More specifically, the dichroic mirror 13 is so configured that it admits only green or blue light but reflects almost 100% of red light. The servo light incident from the light entrance/exit surface A of the optical recording medium 21 passes through the first substrate 5, recording layer 4, filter layer 6 and first gap layer 8, is reflected by the reflective film 2, and passes again through the first gap layer 8, filter layer 6, recording layer 4 and first substrate 5 to emit from the light entrance/exit surface A. The returning servo light passes through the objective lens 12 and is reflected by the dichroic mirror by almost 100%, and then a servo information detector (not shown) detects servo information in the returning servo light. The detected servo information is used for the focus servo operation, tracking servo operation, slide servo operation, and the like. The holographic material containing the recording layer 4 is designed so as not to be sensitive to red light. For this reason, even when the servo light has passed through the recording layer 4 or has been reflected diffusively by the reflective film 2, the recording layer 4 is not adversely affected. In addition, the returning servo light that has been reflected by the reflective film 2 is reflected by the dichroic mirror 13. Accordingly, the servo light is not detected by a CMOS sensor or CCD 14 used for the detection of reconstructed images, and thus does not interfere with the operation of diffracted light.

Figure 5:
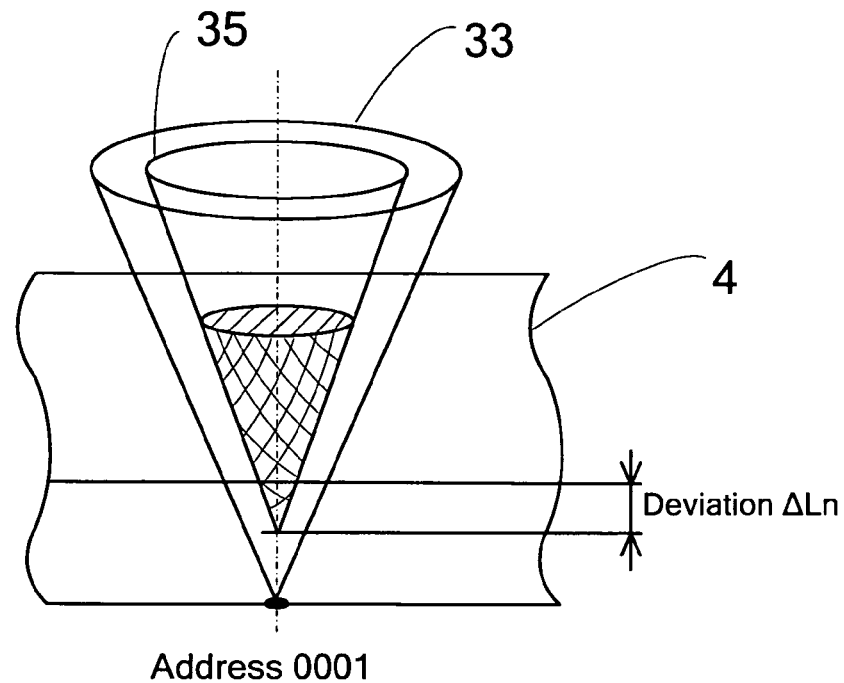
FIG. 5 is a schematic diagram showing a deviation $\Delta Ln$ of a focus point of recording light.

The information light and/or the reference light are irradiated to a plurality of the focus point pattern recorded on the recording layer 4, the dffractive light therefrom is received, and the minimum deviation $\Delta Lmin$ having the minimum squared deviation value is determined among the deviations $\Delta L1$, $\Delta L2$, $\Delta L3$ . . . $\Delta Ln$, in the thickness direction of the recording layer 4 as shown in FIG. 5. The focal length L of the information light and/or the reference light are adjusted by using the minimum deviation $\Delta Lmin$ as an offsetting value in the focusing direction, and the information light and the reference light are generated by the space-light modulator 25. Since no further recording cannot be performed on the focal position pattern, the recording of the horizontal information of the information light and the reference light for recording is performed on a region where the focal position pattern is not recorded by shifting the information light and reference light for recording.

Both the information light and the recording reference light emitted from recording/reproduction laser source and generated by the space-light modulator 25 pass through a polarizing plate 16, and then are linearly polarized. The linearly polarized light then passes through a half mirror 17 and is circularly polarized after passing through a quarter wave plate 15. The circularly polarized light then passes through the dichroic mirror 13 and the objective lens 12, and is applied onto the optical recording media 21 in such a way that optical interference takes place between the information light and reference light to create interference images in the recording layer 4. The information light and reference light are incident from the light entrance/exit surface A and interact with each other in the recording layer 4 to form an interference image to be recorded there. Thereafter, the information light and/or the reference light passes through the recording layer 4, launching into the filter layer 6. There, before reaching the bottom of the filter layer 6, the information light and/or the reference light is reflected and becomes returning light. More specifically, the information light and recording reference light do not reach the reflective film 2. This is because the filter layer 6 is formed of a single-layered cholesteric liquid crystal layer whose helical pitch is continuously changed in the thickness direction thereof and thus admits only red light. Moreover, if the intensity of light that has undesirably passed through the filter layer 6 is suppressed to 20% or less of that of the incident light, there will be no practical problems even when such light reaches the bottom of the filter layer 6 and is reflected back as returning light, because this returning light is again reflected by the filter layer 6 and its intensity in reproduction light (reference light for reproducing) is as small as 4% (20%× 20%) or less of that of the diffracted light.

-Fixing of the Recording-

After the interference image is recorded on the recording layer 4, the fixing light is irradiated to the recorded regions at least within 28 hours, and then the recording of the interference image is fixed.

Second Embodiment

Figure 7:
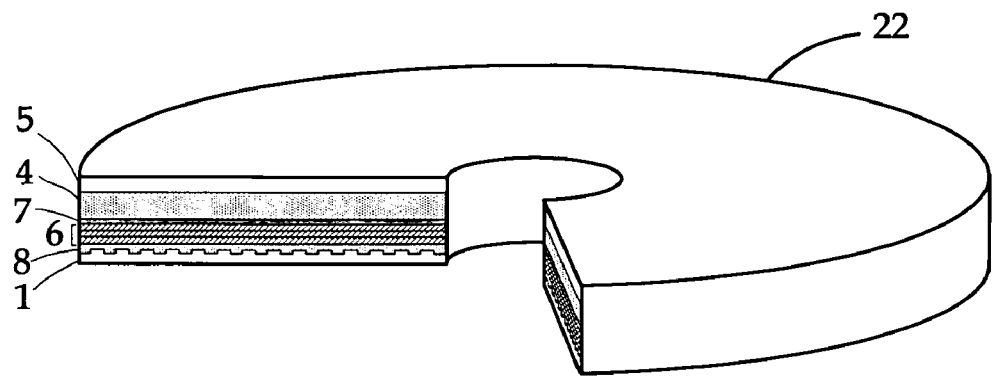
FIG. 7 is a perspective diagram showing a structure of an optical recoding medium.
Figure 13:
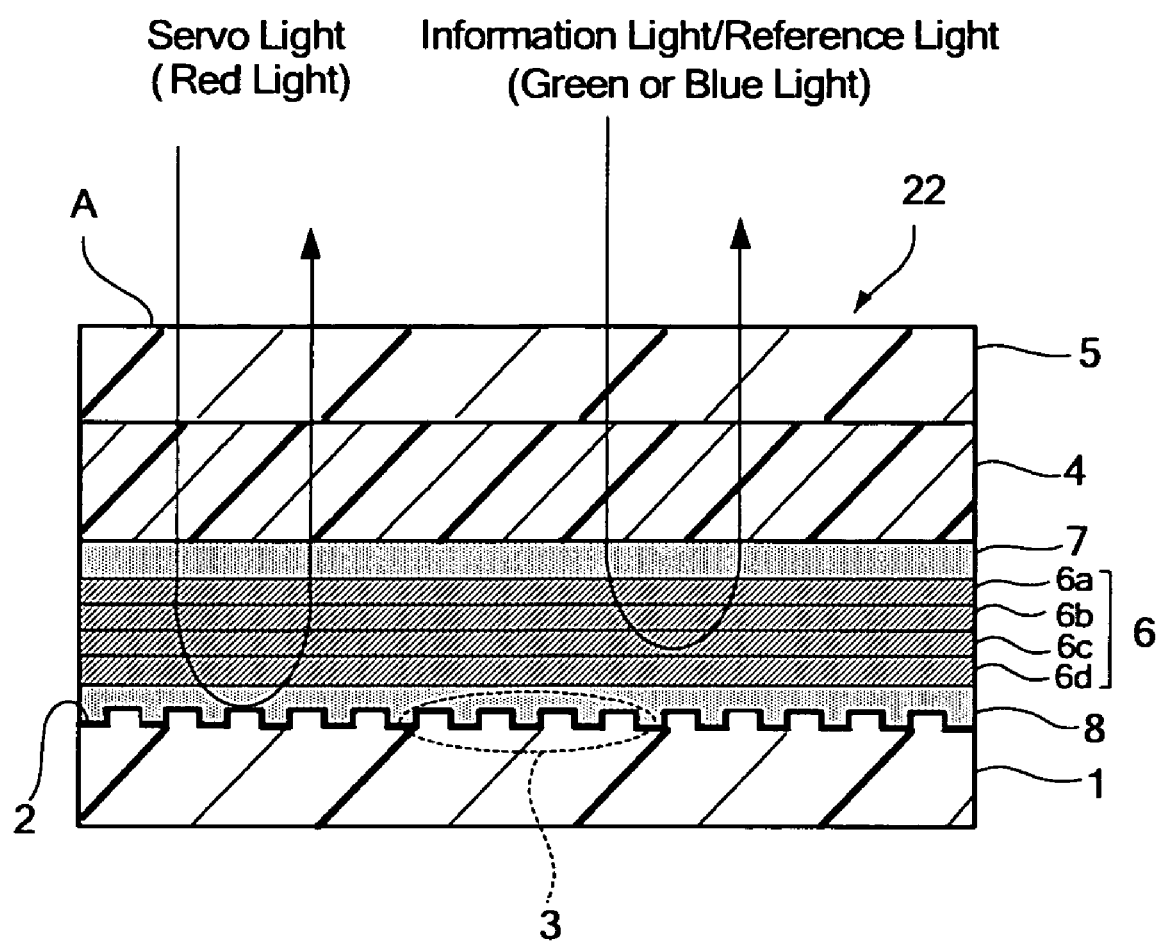
FIG. 13 is a schematic cross-sectional diagram showing an example of the optical recording medium according to the second embodiment of the present invention.

FIG. 13 is a schematic cross-sectional view showing the structure of the optical recording medium 22 according to the second embodiment of the present invention. FIG. 7 is a perspective diagram wherein the optical recording medium 22 is partially cut and removed. The optical recording medium 22 has the identical exterior shape to that of the optical recording medium 21 shown in FIG. 12. In an optical recording medium 22 according to the second embodiment, a servo pit pattern 3 is formed on a substrate 1 made of polycarbonate resin or glass, and the serve pit pattern 3 is coated with Al, Au, Pt or the like to form a reflective film 2. The height of the servo pit pattern 3 is generally the same as in the first embodiment.

The structural difference between the first embodiment and the second embodiment is that a second gap layer 7 is disposed between the filter layer 6 and the recording layer 4 in the optical recording medium 22 of the second embodiment.

After forming a first gap layer 8, a filter layer 6 which is a laminate of four cholesteric liquid crystal layers is formed on the first gap layer, as in the case of the first embodiment.

In the second gap layer 7, there is a point at which both information light and reference light (light for reproducing) focus; if this area is embedded in photopolymers, excessive exposure takes places and thus an excess amount of monomers are consumed, leading to poor multiplexing recording performance. To avoid this, it is effective to provide a transparent, inert second gap layer.

In the optical recording medium 22, the second substrate 1 is 1.0 mm in thickness, the first gap layer 8 is 100 μm in thickness, the filter layer 6 is 3 μm to 5 μm in thickness, the second gap layer 7 is 70 μm in thickness, the recording layer 4 is 0.6 mm in thickness, and the first substrate 5 is 0.4 mm in thickness, bringing to the total to about 2.2 mm.

Upon recording and reproduction of information, the optical recording medium 22 having the structure described above is irradiated with red servo light and green information light and green recording and reproduction reference light. The servo light is incident from the light entrance/exit surface A, passes through the recording layer 4, second gap layer 7, filter layer 6 and first gap layer 8, and is reflected by the reflective film 2 to become returning servo light. This returning servo light sequentially passes through the first gap layer 8, filter layer 6, second gap layer 7, recording layer 4 and first substrate 5 again, and emits from the light entrance/exit surface A.

-Fixing of the Recording-

The fixing of the recording is performed in the same manner as in the first embodiment.

(Method for Manufacturing an Optical Recording Medium)

The method for manufacturing an optical recording medium is a method for manufacturing the optical recording medium of the present invention. The method for manufacturing the optical recording medium of the present invention contains a filter layer formation step, a reflective film formation step and a recording layer formation step, and further contains other steps, if necessary.

-Filter Layer Formation Step-

The filter layer formation step is a step for forming a filter layer which is formed of a laminate wherein two or more cholesteric liquid crystal layers mentioned above are laminated on a second substrate.

In the filter layer forming step, it is preferable in view of the production efficiency that the aforementioned filter for an optical recording medium is processed into an optical recording medium shape, and the processed filter is bonded to the second substrate to form a filter layer.

The shape of the optical recording medium is, for example, disc shape or card-like shape.

The method for processing the filter into a shape of the optical recording medium is not particularly limited, and can be appropriately selected depending on the intended purpose. For example, a cutting process with a press cutter, a stamping process with a stamping cutter, or a burning-off process with a laser cutter can be used.

The filter is bonded to the second substrate by use of, for example, an adhesive or tackiness agent in a manner such that no air bubble is trapped therebetween.

The adhesive is not particularly limited and can be appropriately selected depending on the intended purpose. Examples thereof include UV curable adhesives, emulsion adhesives, one-component curable adhesives and two-component curable adhesives. These known adhesives can be used in any combination.

The tackiness agent is not particularly limited and can be appropriately selected depending on the intended purpose; examples thereof include rubber agents, acrylic agents, silicone agents, urethane agents, vinylalkyl ether agents, polyvinylalcohol agents, polyvinylpyrrolidone agents, polyacrylamide agents and cellulose agents.

The lamination method of the cholesteric liquid crystal layers is not particularly limited, and can be appropriately selected depending on the intended purpose. Examples thereof include the following (1)-(5):

(1) A method wherein each cholesteric liquid crystal layers is prepared separately, and the prepared cholesteric liquid crystal layers are laminated via the adhesive or tackiness agent.
(2) A method wherein each cholesteric liquid crystal layers is prepared separately, and the prepared cholesteric liquid crystal layers are laminated by thermo-compression bonding.
(3) A method wherein each cholesteric liquid crystal layers is prepared separately, and the prepared cholesteric liquid crystal layers are laminated by fusing the interferences of the cholesteric liquid crystal layers.
(4) A method wherein a cholesteric liquid crystal layer is coated to form a film, and another cholesteric liquid crystal layer is further coated on the formed cholesteric liquid crystal layer to form a laminate.
(5) A method wherein a cholesteric liquid crystal layer is formed on a transparent base, and another cholesteric liquid crystal layer is further coated and formed on the transparent base to form a laminate.

Among the above-listed method, the coating-lamination method (5) is preferable in view of the production efficiency, and cost performance.

In the lamination method (1), the adhesive and tackiness agent are not particularly limited, and can be appropriately selected depending on the intended purpose. Examples thereof include a UV curable adhesive, an acrylic agent, and the like. The applied thickness of the adhesive or tackiness agent is not particularly limited, and can be appropriately selected depending on the intended purpose. In the case of the adhesive, the thickness is preferably 0.1 µm to 10 µm, and more preferably 0.1 µm to 5 µm, in view of the optical properties and thinning effects. In the case of the tackiness agent, the thickness is preferably 1 µm to 50 µm, and more preferably 2 µm to 30 µm.

In the lamination method (2), the method of the thermo-compression bonding is, for example, a heat-seal method, an ultrasonic method, an impulse seal method, or a high frequency sealing method.

In the lamination method (3), the method of fusing is, for example, applying a solvent which slightly dissolves and/or swells the cholesteric liquid crystal layer, and integrating the cholesteric liquid crystal layers by the fusion of the interferences thereof.

Examples of the solvent which slightly dissolves and/or swells the cholesteric liquid crystal layer include: aromatic compounds such as toluene, benzene, xylene and the like; alcohols such as methanol, ethanol, and the like; cyclic hydrocarbons such as cyclohexane, cyclopentane, and the like; ketones such as acetone, methyl ethyl ketone (MEK) and the like; ethers such as isopropylether, and the like; esters such as ethylacetate, and the like; and chloride solvents such as chloroform, dichloromethane, and the like. Among them, toluene, cyclohexane, cyclopentane, methyl ethyl ketone (MEK), isopropylalcohol are especially preferable.

In the lamination method (4), the coating method is not particularly limited, and can be selected depending on the intended purpose. Examples thereof include an inkjet method, a spin-coating method, a kneader-coating method, a bar-coating method, a dye-coating method, a blade-coating method, a casting method, a dipping method, a curtain-coating method, and the like.

The formation of the cholesteric liquid crystal layer in accordance with the coating method is preferable performed, for example, by using (applying and drying) a solution (coating liquid) wherein the cholesteric liquid crystal layer material is dissolved in a solvent.

In the case the UV curable is optionally performed on the coated layer, the conditions thereof are not particularly limited, and can be appropriately adjusted depending on the intended purpose. The irradiating UV ray is preferably of 160 nm to 380 nm, and more preferably of 250 nm to 380 nm. The exposure duration is preferably 10 seconds to 600 seconds, and more preferably 10 seconds to 300 seconds with the exposure luminance of 10 mW/cm$^2$. In the case where the exposure luminance is reduced to 1 mW/cm$^2$, the exposure duration is not significantly varied as the addition amount of the reaction initiator is generally increased, and is preferably 10 seconds to 600 second, and more preferably 10 seconds to 300 seconds.

In the lamination method (5), the material for the transparent base can be an inorganic material or organic material. Examples of the inorganic material include a glass, a quartz glass, silicone, and the like. Examples of the organic material include: acetate resins such as triacetylcellulose; polyester resins; polyethersulfone resins; polysulfone resins; polycarbonate resins; polyamide resins; polyimide resins; polyolefin resins; acrylic resins; polynorbomene resins; cellulose resins; polyarylate resins; polystyrene resins; polyvinylalcohol resins; polyvinylchloride resins; polyvinylidenechloride resins; polyacrylic resins; and the like. These may be used singly or in combination of two or more.

(Optical Reproducing Method and Optical Reproducing Apparatus)

The optical reproducing method of the present invention contains a focus point controlling step, and an interference image reproducing step, and optionally contains appropriately selected other steps, if necessary.

The optical reproducing method of the present invention is suitably performed by means of an optical reproducing apparatus, and the optical reproducing apparatus contains a focus point controlling unit, and an interference image reproducing unit, and optionally contains appropriately selected other units, if necessary.

The focus point controlling step of the optical reproducing method of the present invention is suitably performed by means of the focus point controlling unit of the optical reproducing apparatus, the interference image reproducing step of the optical reproducing method of the present invention is suitably performed by means of the interference image reproducing unit of the optical reproducing apparatus, and the appropriately selected other steps of the optical reproducing method are suitably performed by means of the appropriately selected other units of the optical reproducing apparatus.

Hereinafter, each steps of the optical reproducing method are explained.

<Focus Point Controlling Step>

The focus point controlling step is a step of applying reference light to a focus point pattern recorded on a recording layer disposed in an optical recording medium, and controlling a focal length L so as to match the focal length L with a focal length BL, where the focal length L is a distance between a position of an objective lens disposed on an optical path of the reference light and a focal point of the reference light transmitted through the objective lens, and the focal length BL is a distance between a position of the objective lens and a focal point recorded in the focus point pattern.

The focus point controlling step of the optical reproducing method can be performed in the same manner to the focus point controlling step mentioned in the optical recording method.

<Interference Image Reproducing Step>

The interference image reproducing step is a step of applying the reference light for reproducing (reproduction light) whose focal length L is controlled in the focus point controlling step, to an interference image recorded on the recording layer 4 in accordance with the optical recording method of the present invention so as to reproduce a recorded information corresponding to the interference image. The reference light for reproducing is preferably applied at the same angle to an incident angle of the reference light at the time of recording the interference image.

Figure 14:
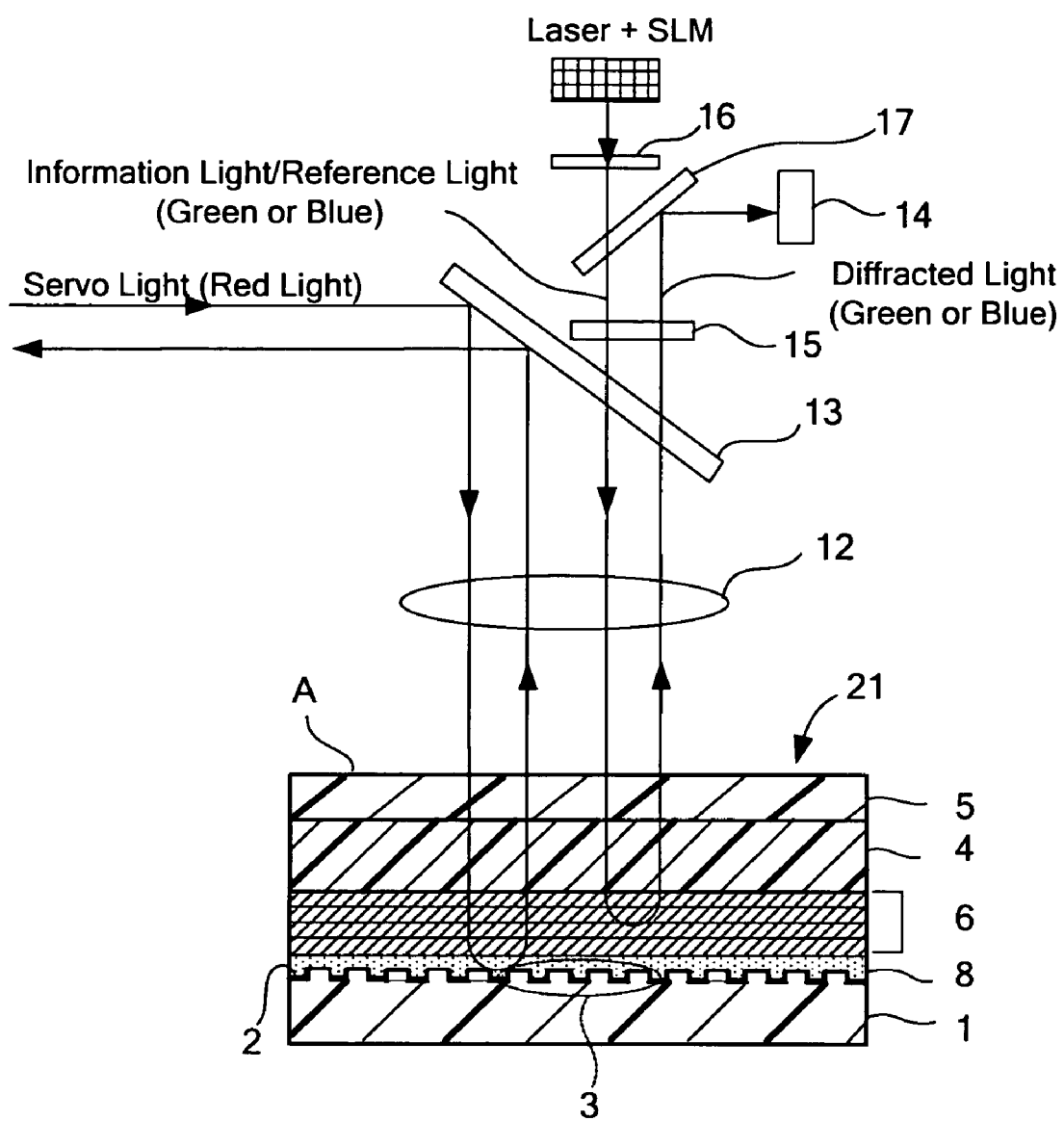
FIG. 14 is a conceptual vertical view showing an example of an optical system accompanying with an optical recording medium of the present invention.

In order to apply the reference light to the interference image recorded in the recording layer 4, as shown in FIG. 14, the focus point of the reference light is set to where the interference image is recorded within the recording layer 4 by precisely controlling the objective lens 12, and then the reference light is applied. As a result of the application the reference light, diffracted light is generated, and the diffracted light is passed through the objective lens 12, and further passed through the dichroic mirror 13, and a quarter wave plate 15. The transmitted light is reflected by a half mirror 17, and the information is reproduced from the diffracted light detected by a detector 14.

In the case where two or more focus point patters are recorded on the optical recording medium, the control of the focal length L in accordance with the focal point controlling step and the reproduction of the interference image in accordance with the interference image reproducing step are suitably performed with respect to each of the focus point patterns in the optical reproducing method.

Moreover, the focal length L of the reference light is controlled based on each of the focus point patterns by means of the focus point controlling unit, the controlled amounts are detected as deviations $\Delta Ln$ (n is an integer of 1 or more), the minimum deviation $\Delta Lmin$ is determined as a minimum squared value among the detected deviations $\Delta Ln$, and the reproduction of the interference image is performed in accordance with the interference image reproducing step by using the reference light whose focus length L is controlled based on the minimum deviation $\Delta Lmin$.

In the optical recording and reproducing method, information light with the two-dimensional intensity distribution and reference light with almost the same light intensity to that of the information light are superimposed inside the photosensitive recording layer, the resulted interference pattern formed inside the recording layer induces a distribution of the optical properties of the recording layer to thereby record such the distribution as an information. When the recorded information is read (reproduced), only reference light is irradiated to the recording layer from the same direction to that irradiated at the time of recording, a light having a intensity distribution corresponding to the distribution of the optical property formed inside the recording layer is emitted from the recording layer as diffracted light.

The optical recording method and optical reproducing method of the present invention are performed, for example, by means of an optical recording and reproducing apparatus explained hereinafter.

The optical recording and reproducing apparatus applied in the aforementioned optical recording and reproducing method is explained with reference to FIG. 15.

Figure 15:
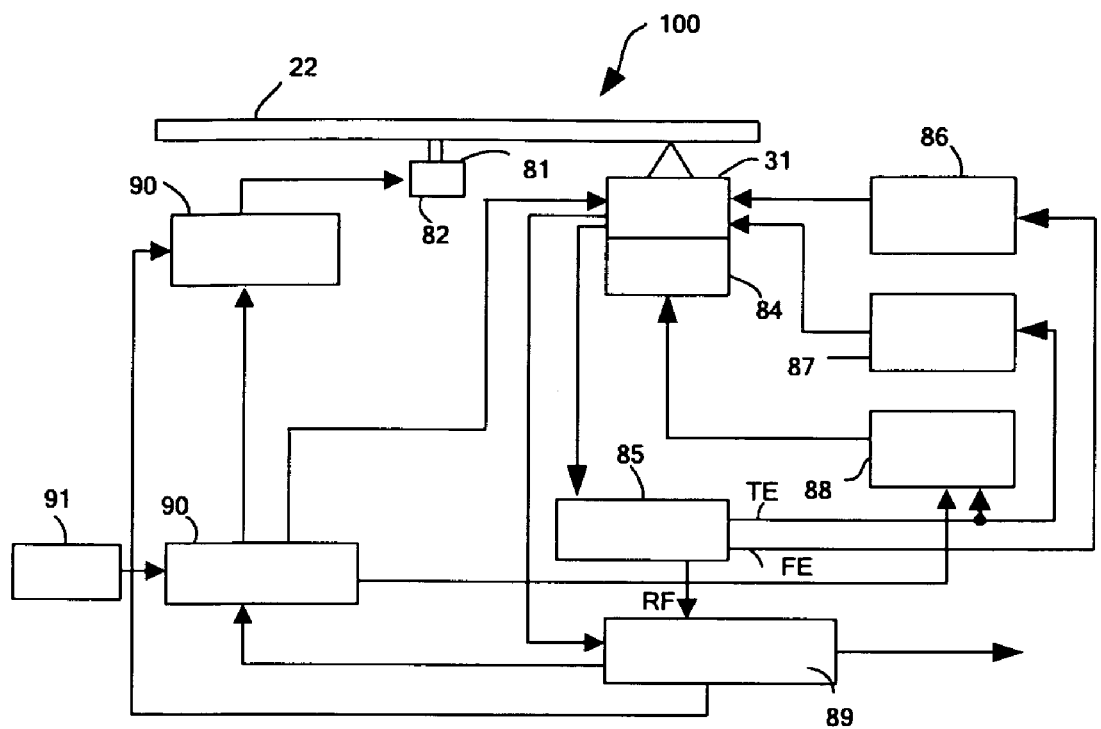
FIG. 15 is a block diagram showing an example of a whole configuration of the optical recording and reproducing apparatus of the present invention.

FIG. 15 is a whole structural diagram of the optical recording and reproducing apparatus according to an example of the present invention. Note that, the optical recording and reproducing apparatus contains both of the optical recording apparatus and the optical reproducing apparatus.

This optical recording and reproducing apparatus 100 is equipped with a spindle 81 on which an optical recording medium 22 is deposed, a spindle motor 82 which rotates the spindle 81, and a spindle servo circuit 83 which controls the spindle motor 82 so as to maintain the optical recording medium 22 at the predetermined revolution number.

The optical recording and reproducing apparatus 100 is also equipped with a pickup unit 31 which irradiates information light and reference light to the optical recording medium so as to record an information, and irradiates reference light for reproducing (reproduction light) to the optical recording medium 22 so as to detect diffracted light to thereby reproduce the recorded information, and a driving unit 84 which enables the pickup unit 31 to move in the radius direction of optical recording medium 22.

The optical recording and reproducing apparatus 100 is equipped with a detecting circuit 85 which detects focusing error signal FE, tracking error signal TE, and reproducing signal RF from the output signal of the pickup unit 31, a focusing servo circuit 86 which drives an actuator in the pickup unit 31 so as to move an objective lens (not shown in FIG. 15) to the radium direction of the optical recording medium 22 based upon the focusing error signal FE detected by the detecting circuit 85 to thereby perform focusing servo, a tracking servo circuit 87 which drives an actuator in the pickup unit 31 so as to move an objective lens (not shown in FIG. 15) to the radium direction of the optical recording medium 22 based upon the tracking error signal TE detected by the detecting circuit 85 to thereby perform tracking servo, and a sliding servo unit 88 which controls the driving unit 84 based upon the tracking error signal TE and an indication from a controller mentioned hereinafter so as to move the pickup unit 31 to the radius direction of the optical recording medium 22 to thereby perform sliding servo.

Moreover, the optical recording and reproducing apparatus 100 is equipped with a signal processing circuit 89 which decodes output data of the later described CMOS or CCD array in the pickup unit 31, to thereby reproduce the data recorded in the data area of the optical recording medium 22, and reproduces the standard clock or determines the address based on the reproducing signal RF from the detecting circuit 85, a controller 90 which controls the whole optical recording and reproducing apparatus 100, and a controlling unit 91 which gives various instructions to the controller 90.

The controller 90 is configured to input the standard clock or address information outputted from the signal processing circuit 89 as well as controlling the pickup unit 31, the spindle servo circuit 83, the slid servo circuit 88, and the like. The spindle servo circuit 83 is configured to input the standard clock outputted from the signal processing circuit 89. The controller 90 contains CPU (center processing unit), ROM (read only memory), and RAM (random access memory), the CPU realizes the function of the controller 90 by executing programs stored in the ROM on the RAM, a working area.

The optical recording and reproducing apparatus applied for the optical recording and reproducing method uses the optical recording method and optical recording apparatus of the present invention. Therefore, the optical recording and reproducing apparatus inhibits any shift of the selective reflection wavelength at the time when the incident angle is changed, prevents the information light and the reference light from being diffused reflected from the reflective film of the optical recording medium, prevents the generation of noises, and realizes high density recording which has not been realized before.

Prophetical examples of the present invention will be explained hereinafter, but it is not intended to limit the scope of the present invention thereby.

EXAMPLE 1

In order to carry out the optical recording method of the present invention, a filter for an optical recording medium is prepared first, and then the prepared filter is laminated on a substrate so as to prepare an optical recording medium.

-Preparation of the Filter for the Optical Recording Medium-

Onto a polycarbonate film (product name: Iupiron; the manufacturer: Mitsubishi Gas Chemical Co., Inc.) having a thickness of 100 μm, polyvinyl alcohol (product name: MP203; the manufacturer: KURARAY CO., LTD.) is applied so as to have the applied thickness of 1 μm, to thereby prepare a base film as the base. The thus prepared base film is passed through a rubbing devise so as to subject the polyvinyl alcohol surface of the base film to the rubbing process, to thereby provide the base film a function for orientating liquid crystals.

Sequentially, cholesteric liquid crystal layer coating liquids A, B, C having the compositions presented in Table 1 are prepared in accordance with the conventional manner.

TABLE 1

| Component (part by mass) | Cholesteric liquid crystal layer coating liquid | | |
|---|---|---|---|
| | A | B | C |
| UV polymerizable liquid crystal | 93.16 | 94.02 | 94.74 |
| Chiral agent | 6.84 | 5.98 | 5.26 |
| Photopolymerization Initiator | 0.10 | 0.10 | 0.10 |
| Sensitizer | 0.02 | 0.02 | 0.02 |
| Solvent | 400 | 400 | 400 |

UV polymerizable liquid crystal: PALIOCOLOR LC2422 [product name], manufactured by BASF AG
Chiral agent: PALIOCOLOR LC756 [product name], manufactured by BASF AG
Photopolymerization initiator: Irga Cure 369 [product name], manufactured by Ciba Specialty Chemicals KK
Sensitizer: diethylthioxanthone
Solvent: methyl ethyl ketone (MEK)

Onto the base film, the cholesteric liquid crystal layer coating liquid A is applied by means of a bar coater, and is dried. Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer A having a thickness of 2 μm.

Onto the cholesteric liquid crystal layer A, the cholesteric liquid crystal layer coating liquid B is applied by means of a bar coater, and is dried. Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer B having a thickness of 2 μm.

Onto the cholesteric liquid crystal layer B, the cholesteric liquid crystal layer coating liquid C is applied by means of a bar coater, and is dried.

Thereafter, the orientation thereof is matured at 110° C. for 20 seconds. It is then exposed to a ultra-high pressure mercury lamp having an exposure energy of 500 mJ/cm$^2$ at 110° C., to thereby form a cured cholesteric liquid crystal layer C having a thickness of 2 μm.

In the manner as mentioned above, there can be prepared a three-layered filter for an optical recording medium of Example 1, which has circular polarization separating property, and has the cholesteric liquid crystal layers each having mutually different a center wavelength of selective reflection, and all having the same clock-wise spiral direction.

-Preparation of the Optical Recording Medium-

The optical recording medium is prepared with a first substrate, a second substrate, a recording layer, and a filter layer.

As the second substrate, a conventional polycarbonate resin substrate for DVD+RW having a diameter of 120 mm, and a thickness of 0.6 mm is used. The servo pit pattern is formed on the whole surface of the second substrate, and the servo pit pattern has a track pitch of 1.6 μm, a pit depth of 100 nm, and a pit width of 1 μm.

A reflective film is formed on the surface of the servo pit pattern of the second substrate. As a reflective film material, aluminum (Al) is used. The Al reflective film is formed in accordance with DC magnetron sputtering method so as to have a thickness of 200 nm. Onto the thus prepared reflective film, a polycarbonate film having a thickness of 100 μm is bonded with a UV curable resin, as a first gap layer.

Thereafter, the filter for an optical recording medium is cut into a disk size so as to be able to dispose on the substrate. The filter is bonded to the substrate so as to make the base film side of the filter face to the servo pit pattern side of the substrate. The bonding can be performed by using a UV curable resin or a tackiness agent in a manner such that no air bubble is trapped between the filter and the substrate. In this way, the filter layer can be prepared.

As a material for the recording layer, a photopolymer coating liquid having the following composition is prepared.

-The Composition of the Photopolymer Coating Liquid-

| | |
|---|---|
| Di-(urethaneacrylate) oligomer (ALU-351, by Echo Resins Corp.) | 59 parts by mass |
| Isobornylacrylate | 30 parts by mass |
| Vinylbenzoate | 10 parts by mass |
| Polymerization initiator (Irga Cure 784, by Ciba Specialty Chemicals KK) | 1 part by mass |

The thus prepared photopolymer coating liquid is applied onto the filter layer by means of a dispenser. On the photopolymer, a first substrate formed of a polycarbonate resin, having a diameter of 12 cm and a thickness of 0.6 mm is disposed and pressed down, and then the edge of the disk and the first substrate are bonded with an adhesive.

The disk has a fringe portion at the edge thereof which makes the photopolymer layer have a thickness of 500 μm. By bonding the first substrate with the fringe portion, the thickness of the photopolymer layer is controlled, and any excessive photopolymer oozes out and is removed. In this way, the optical recording medium of Example 1 can be prepared. FIGS. 7 and 12 are schematic cross sectional diagrams showing embodiments similar to this example.

<Recording of the Focus Point Pattern>

The thus obtained optical recording medium is set in an optical recording medium, the information and reference light each having the wavelength of 532 nm and the exposure energy of approximately 50 μJ/cm$^2$ are applied to the recording layer of the optical recording medium for 100 ns so as to record the focus point pattern at three regions which are equally divided on the circumference of the recording layer. The focus point pattern stores a location information, e.g. (0001F, 0002F, 0003F), corresponded to the address information, e.g. (0001, 0002, 0003), formed in the servo pit pattern.

In Example 1, the horizontal location of the address information and the horizontal location of the focus point are arranged to be matched, and the position information regarding the difference in the thickness direction of the recording layer is recorded as a pattern.

The recorded focus point pattern is exposed with fixing light having a wavelength of 532 nm and the exposure energy of 100 mJ/cm$^2$ for 1 ms to thereby fix the focus point pattern.

<Detection of Minimum Deviation ΔLmin of the Focus Point of the Information and Reference Light>

The servo light having a wavelength of 650 nm is applied to the thus obtained optical recording medium so as to perform a tracking servo. Under this condition, the information light and the reference light (light for reproducing the focus point pattern) each having a wavelength of 532 nm are applied to the focus point pattern, the reflected light therefrom is received, the light for reproducing the focus point pattern is sifted to a location where the focus point is met, and detect the sifted amount relative to the focus point information as the deviation ΔLn (see FIG. 5).

The deviation ΔLn can be determined as a numerical value, such as (for example, 2 μm) from Z-axis, when the focus point is determined as a starting point, and the Z-axis are along the thickness direction of the recording layer.

The minimum deviation ΔLmin is determined as a deviation which has the minimum squared value among the detected deviations ΔL.

<Recording on the Recording Layer>

Figure 6:
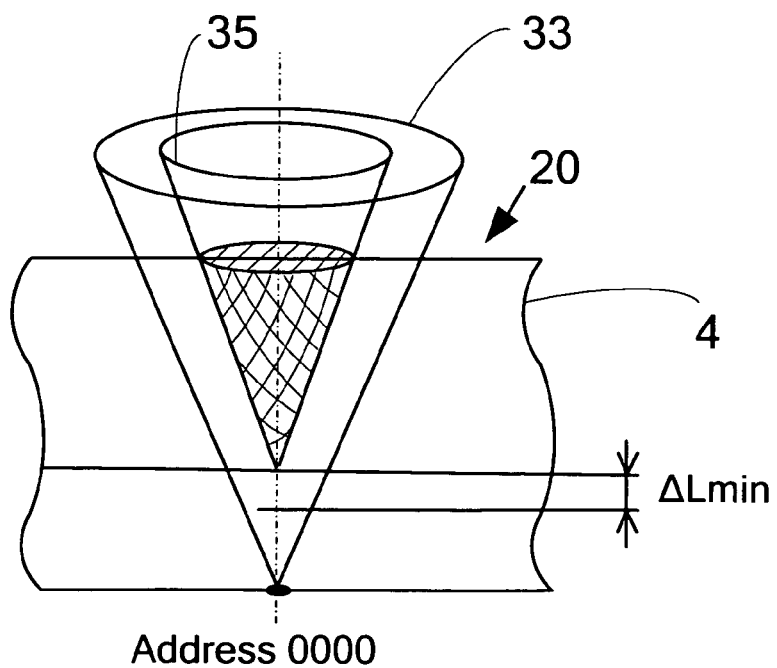
FIG. 6 is a schematic diagram showing a condition where recording light is applied by offsetting at $\Delta L$ from the focus point of the recording light.

The deviation ΔLmin, i.e., (2 μm) from the Z-axis, is determined as an offset amount as shown in FIG. 6. At the time of applying the information light and the reference light, the offset value is considered, and the focus point of the information and reference light is sifted their locations at 2 μm from the Z-axis by controlling the focal length L to thereby irradiate the information and reference light within a recording region of the recording layer.

The recording on the recording layer is performed as shown in FIG. 14, by applying the information and reference light for recording whose focal length L are controlled, each having the exposure energy of approximately 50 μJ/cm$^2$ to the recording layer 4 for 100 ns to form an interference image, and recording the interference image on the recording layer.

In this manner, the minimum derivation ΔLmin detected by the focus point controlling unit can be obtained as an offset value on the optical recording medium. Once the offset value is determined, recording of an interference image is therefore able to perform at an appropriate region of the recording layer only by performing address and tracking servo using servo light. Since it is not necessary to perform the focusing servo by using servo light, highly accurate recording can be achieved.

-Selective Reflectivity of the Optical Recording Medium-

The selective reflectivity of the thus obtained optical recording medium is measured by means of a spectral reflectometer (a beam oscillator: L-5662, a photo multi-channel analyzer: PMA-11, both manufactured by Hamamatsu Photonics KK).

As shown in FIG. 14, as information or reference light, a laser beam with wavelength at 532 nm is converted to a linearly polarized laser beam by the polarizing plate 16, and is further converted to a clockwise circular polarized laser beam by the quarter wave plate 15. Such the converted laser beam is applied to the optical recording medium as the information or reference light, and a laser beam having a wavelength of 650 nm is applied to the optical recording medium as servo light. As a result, it is confirmed that the servo light is reflected by a reflective film 2.

<Evaluation of the Reproducing Quality>

The evaluation of the reproducing quality of the recorded information is performed by means of the optical recording and reproducing apparatus 100 as shown in FIG. 15. In the evaluation, the reference light is applied to the optical recording medium so as to generate the diffracted light from the interference image, the diffracted light is read by means of a detector 14 shown in FIG. 14 so that the recorded information is reproduced, and hardly any error (spots and frames) is recognized. In this case, the reproduction can be performed by applying the reference light for reproduction (the reproduction light) controlled it's the focal length L by the focus point pattern, to the optical recording medium in the same manner as at the time of the recording.

COMPARATIVE EXAMPLE 1

In Comparative Example 1, the optical recording medium is prepared, recorded, and fixed in the same manner as in Example 1, provided that the detection of the minimum deviation ΔLmin and the control of the focal length L are not performed. Specifically, at the time of applying the information and reference light, each having a wavelength of 532 nm, forming an interference image, recording and fixing the interference image, under the condition where the servo light having a wavelength of 650 nm is applied to the optical recording medium so as to perform a tracking servo, since the detection of the minimum deviation ΔLmin of the focal length is not performed, an offset value cannot be adjusted based on the minimum deviation ΔLmin. Therefore, when the recorded information reproduced and read by means of the detector 14 as shown in FIG. 14, more errors (spots and frames) are recognized than Example 1.

According to the present invention, the problems in the related art can be solved, and there can be provided an excellent optical recording method, optical recording apparatus, optical recording medium, and optical reproducing method, which are capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus.

The optical recording method of the present invention is an excellent method which is capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus. The optical recording method of the present invention is suitably applied for a holographic optical recording method capable of high density image recording.

The optical recording apparatus of the present invention is an excellent apparatus which is capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus. The optical recording apparatus of the present invention is suitably applied for a holographic optical recording apparatus capable of high density image recording.

The optical recording medium of the present invention can be widely used as an excellent optical recording medium which is capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus.

The optical reproducing method of the present invention is an excellent method which is capable of effectively performing a location control for light irradiation, such as focusing control or tracking control, at the time of recording or reproducing, and efficiently performing adjustments related to thickness variations of a recording layer disposed in an optical recording layer or errors of an optical recording and reproducing apparatus. The optical reproducing method of the present invention is suitably applied for a holographic optical reproducing method capable of reproducing highly dense recorded image.

What is claimed is:

1. An optical recording method, comprising:
   (i) applying recording light to at least one focus point pattern recorded on a recording layer disposed in an optical recording medium, and controlling a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and a focus point recorded in the focus point pattern; and
   (ii) applying the recording light whose focal length L is controlled to an area other than the area where the focus point pattern is recorded on the recording layer so as to form an interference image, and recording the interference image on the recording layer,
   wherein the optical recording medium comprises the recording layer for a holographic recording, and the at least one focus point pattern recorded on the recording layer, and
   further wherein the recording light comprises information light and reference light, and a holographic pattern is recorded by making the information light and the reference light interfere.

2. The optical recording method according to claim 1, wherein the optical recording medium has two or more focus point patterns, and the step (i) and the step (ii) are respectively performed per each of the focus point patterns.

3. The optical recording method according to claim 1, wherein the optical recording medium has two or more focus point patterns,
   the step (i) is performed per each of the focus point patterns so as to control the focus length L of the recording layer, and the step (i) further comprises detecting a controlled amount as a deviation ΔLn (n is an integer of 1 or more) per each of the focus point patterns, and determining a minimum derivation ΔLmin which has a minimum squared value among the detected deviations ΔLn, and
   the step (ii) is performed by applying the recording light whose focal length L is controlled based on the minimum deviation ΔLmin.

4. The optical recording method according to claim 1, wherein the focus point pattern records location information relative to a thickness direction of the recording layer, the focus point pattern contains at least one of image data and numerical data.

5. The optical recording method according to claim 1, wherein, in the step (i), the control of the focal length L is performed in accordance with at least one selected from the group consisting of an astigmatism method, a Foucault method, and a critical angle method.

6. The optical recording method according to claim 1, wherein, in the step (i), the control of the focal length L is performed by applying the recording light to the focus point pattern, receiving diffracted light therefrom, and detecting a location where a signal intensity of the diffracted light becomes maximum.

7. The optical recording method according to claim 1, wherein, in the step (i), the control of the focal length L is performed by applying the recording light to the focus point pattern, receiving diffracted light therefrom, and detecting a location where a signal error of the diffracted light becomes a minimum.

8. The optical recording method according to claim 1, wherein the optical recording medium further comprises a first substrate, a filter layer, and a second substrate, and wherein the first substrate, the recording layer, the filter layer, and the second substrate are disposed in this order.

9. The optical recording method according to claim 1, wherein the optical recording medium is either a reflective holographic recording medium or a transmission holographic recording medium.

10. The optical recording method according to claim 1, wherein the applying of the recording light is performed in a manner such that an optical axis of the information light and an optical axis of the reference light are collinearly aligned.

11. An optical recording apparatus, comprising:
a focus point controlling unit which is configured to apply recording light to at least one focus point pattern recorded on a recording layer disposed in an optical recording medium, and to control a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and a focus point recorded in the focus point pattern; and
an interference image recording unit which is configured to apply the recording light whose focal length L is controlled to an area other than the area where the focus point pattern is recorded on the recording layer so as to form an interference image, and recording the interference image on the recording layer,
wherein the optical recording medium comprises the recording layer for a holographic recording, and the at least one focus point pattern.

12. The optical recording apparatus according to claim 11, wherein the optical recording medium has two or more focus point patterns, and the control of the focal length L by the focus point controlling unit and the recording of the interference image by the interference image recording unit are respectively performed per each of the focus point patterns.

13. The optical recording apparatus according to claim 11, wherein the optical recording medium has two or more focus point patterns,
the focus point controlling unit is configured to control the focal length L of the recording light based on all of the focus point patterns, to detect a controlled amount as a deviation $\Delta Ln$ (n is an integer of 1 or more) per focus point pattern, and to determine a minimum derivation $\Delta Lmin$ which has a minimum squared value among the detected deviations $\Delta Ln$, and
the interference image recording unit is configured to apply the recording light whose focal length L is controlled based on the minimum deviation $\Delta Lmin$.

14. An optical recording medium, comprising:
a recording layer for a holographic recording; and
at least one focus point pattern recorded on the recording layer,
wherein the recording layer comprises an interference image which is recorded by a method comprising:
(i) applying recording light to the focus point pattern, and controlling a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and a focus point recorded in the focus point pattern; and
(ii) applying the recording light whose focal length L is controlled to an area other than the area where the focus point pattern is recorded on the recording layer so as to form the interference image, and recording the interference image on the recording layer.

15. An optical reproducing method, comprising:
applying reference light to a focus point pattern recorded on a recording layer disposed in an optical recording medium, and controlling a focal length L so as to match the focal length L with a focal length BL, where the focal length L is a distance between a position of an objective lens disposed on an optical path of the reference light and a focus point of the reference light transmitted through the objective lens, and the focal length BL is a distance between a position of the objective lens and a focus point recorded in the focus point pattern; and
applying the reference light whose focal length L is controlled to an interference image recorded on the recording layer so as to reproduce a recorded information corresponding to the interference image,
wherein the interference image is recorded on the recording layer by a method comprising:
(i) applying recording light to the focus point pattern, and controlling a focal length L so as to match the focal length L with a focal length BL, where the focal length L is a distance between a position of an objective lens disposed on an optical path of the recording light and a focus point of the recording light transmitted through the objective lens, and the focal length BL is a distance between a position of the objective lens and the focus point recorded in the focus point pattern; and
(ii) applying the recording light whose focal length L is controlled to an area other than the area where the focus point pattern is recorded on the recording layer so as to form the interference image, and recording the interference image on the recording layer.

16. The optical reproducing method according to claim 15, wherein the recording light comprises information light and reference light, and the reference light for reproducing is applied at the same angle to an incident angle of the reference light applied at the time of recording the interference image.

* * * * *